(12) United States Patent
Goff et al.

(10) Patent No.: US 7,069,149 B2
(45) Date of Patent: Jun. 27, 2006

(54) PROCESS FOR INTERPRETING FAULTS FROM A FAULT-ENHANCED 3-DIMENSIONAL SEISMIC ATTRIBUTE VOLUME

(75) Inventors: Douglas Francis Goff, Danville, CA (US); Luc Vincent, Palo Alto, CA (US); Kevin L. Deal, Houston, TX (US); William S. Kowalik, La Habra Heights, CA (US); Sebastien Bombarde, Oakland, CA (US); Sandra Lee, Danville, CA (US); William R. Volz, Katy, TX (US); Richard C. Jones, Fullerton, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 844 days.

(21) Appl. No.: 10/023,420

(22) Filed: Dec. 14, 2001

(65) Prior Publication Data

US 2003/0112704 A1    Jun. 19, 2003

(51) Int. Cl.
*G01V 1/28* (2006.01)

(52) U.S. Cl. ...................................................... 702/16
(58) Field of Classification Search .................. 702/14, 702/16, 17, 18, 6, 10, 11–13; 367/73; 703/2, 703/5, 10
See application file for complete search history.

(56) References Cited

U.S. PATENT DOCUMENTS

| | | | |
|---|---|---|---|
| 3,899,768 A | 8/1975 | Quay et al. | 340/15.5 DS |
| 4,779,237 A | 10/1988 | Bodine | 367/47 |
| 5,563,949 A | 10/1996 | Bahorich et al. | 364/421 |
| 5,724,309 A | 3/1998 | Higgs et al. | 367/48 |
| 5,831,935 A | 11/1998 | Luo et al. | 367/47 |
| 5,838,564 A | 11/1998 | Bahorich et al. | 364/421 |
| 5,930,730 A * | 7/1999 | Marfurt et al. | 702/16 |
| 5,987,388 A | 11/1999 | Crawford et al. | 702/16 |
| 6,018,498 A | 1/2000 | Neff et al. | 367/72 |
| 6,106,561 A * | 8/2000 | Farmer | 703/10 |
| 6,138,076 A * | 10/2000 | Graf et al. | 702/14 |
| 6,516,274 B1 * | 2/2003 | Cheng et al. | 702/14 |

OTHER PUBLICATIONS

U.S. Prov. Appl. No. 60/215,631, Jun. 30, 2000.*
Bahorich et al., "3-D Seismic Discontinuity for Faults and Stratigraphic Features: The Coherence Cube," SEG Leading Edge, vol. 14, pp. 1053-1058 (1995).

(Continued)

*Primary Examiner*—Donald McElheny, Jr.
(74) *Attorney, Agent, or Firm*—Richard J. Schulte

(57) ABSTRACT

A computer implemented method for interpreting faults from a fault-enhanced 3-D seismic attribute cube. The method includes the steps of extracting faults from a 3-D seismic attribute cube, and of calculating a minimum path value for each voxel of the 3-D seismic attribute cube. A fault network skeleton is extracted from the 3-D seismic attribute cube by utilizing the minimum path values which correspond to voxels within the 3-D seismic attribute cube. The individual fault networks are then labeled, and a vector description of the fault network skeleton is created. The fault network skeleton is subdivided into individual fault patches wherein the individual fault patches are the smallest, non-intersecting, non-bifurcating patches that lie on only one geologic fault. The individual fault patches are then correlated into a representation of geologic faults.

88 Claims, 26 Drawing Sheets

OTHER PUBLICATIONS

Bhalla et al., "Automatic Feature Detection and Correspondence in a Stereo-Vision Application," *1996 Institution of Electrical Engineers*, Abstract (1996).

Blonda et al., "Fuzzy Neural Network Based Segmentation of Multispectral Magnetic Resonance Brain Images," *Proceedings of the SPIE—The International Society for Optical Engineering Conference*, vol. 2761 pp. 146-153, Abstract (1996).

Chung et al., "3-D Interpretation of Imperfect Line Drawings," *BMUC '95 Proceedings of the 6th British Machine Vision Conference*, Part vol. 1, pp. 287-296, vol. 1, Abstract (1995).

Ester et al., "A Density-Based Algorithm for Discovering Clusters in Large Spatial Databases with Noise," *Proceedings of 2nd International Conference on Knowledge Discovery and Data Mining*.

Finn et al., "Seismic 3-3-D and General Processing—Estimation of Three-Dimensional Dip and Curvature from Reflection Seismic Data," *56th Annual International Meeting and Exposition*, pp. 355-358 (Nov. 2-6, 1986).

Grimaud, Michael, "A New Measure of Contrast: the Dynamics," *Proc. SPIE Image Algebra and Morphological Imaging Processing*, pp. 292-305 (Jul. 1992).

Gurney, Charlotte M., "Threshold Selection for Line Detection Algorithms," *IEEE Transactions on Geoscience and Remote Sensing*, vol. GE-18, No. 2 (Apr. 1980).

Hoppe, Hugues, "Surface Reconstruction from Unorganized Points," *Proc. of Siggraph*, pp. 71-78 (1992).

Hutchinson, Suzi, "FZAP! 1.0 Offers Automated Fault Picking," webpage, pp. 1-4 (May/Jun. 1997).

Iverson et al., "Logical/Linear Operators for Image Curves," *IEEE Transactions and Pattern Analysis and Machine Intelligence*, vol. 17, No. 10, pp. 982-996 (Oct. 1995).

Lobregt et al., "Three-Dimensional Skeletonization: Principle and Algorithm," *IEEE Transactions on Pattern Analysis and Machine Intelligence*, vol. PAMI-2, No. 1, pp. 75-77 (Jan. 1980).

Luo et al., "Interpretation 2: Structural Case Histories, Edge Detection and Stratigraphic Analysis Using 3D Seismic Data", *66th Annual SEG Meeting*, pp. 324-327 (Nov. 10, 1996).

Miller et al., "Prediction Intervals for Surface Growing Range Segmentation," *IEEE*, pp. 1027-1033 (1997).

Monga et al., "Using Partial Derivatives of 3D Images to Extract Typical Surface Features," *Computer Vision and Image Understanding*, vol. 61, No. 2, Mar., pp. 171-189 (1995).

Monga et al., "Recursive Filtering and Edge Tracking: Two Primary Tools for 3D Edge Detection," *Image and Vision Computing*, vol. 9, No. 4, pp. 203-214 (Aug. 1991).

Riazanoff et al., "Ridge and Valley Line Extraction from Digital Terrain Models," *Int. J. Remote Sensing*, vol. 9, No. 6, pp. 1175-1183 (1988).

Rosen, Ben, "Morphological Image Processing Techniques Applied to Detection of Correlogram Tracks," *U.S. Navy Journal of Underwater Acoustics*, vol. 44, No. 2 (Apr. 1994).

Rosenfeld et al., "Sequential Operations in Digital Picture Processing," *J. Assoc. Comp. Mach.*, vol. 13, No. 4, pp. 471-494 (1966).

Rosenfeld et al., "Distance Functions on Digital Pictures," *Pattern Recognition*, vol. 1, pp. 33-61 (1968).

Steeghs et al., "Extraction of Attributes from 3D Seismic Data," *EAGE 58th Conference and Technical Exhibition—Amsterdam, The Netherlands*, (Jun. 3-7, 1996).

Vanderbrug, G. J., "Line Detection in Satellite Imagery," *IEEE Transactions on Geoscience Electronics*, vol. GE-14, No. 1 (Jan. 1976).

Van Herk, Marcel, "A Fast Algorithm for Local Minimum and Maximum Filters on Rectangular and Octagonal Kernals," *Pattern Recognition Letters 13*, pp. 517-521 (Jul. 1992).

Vincent, Luc, "Current Topic in Applied Morphological Image Analysis," in *Current Trends in Stochastic Geometry and its Applications*, W. S. Kendall and O. E. Barndorff-Nelson and M. C. van Lieshout, Editors, Chapman & Hall, London, pp. 1-68 (1997).

Vincent, Luc, "Efficient Computation of Various Types of Skeletons," *Proc. SPIE Medical Imaging V*, vol. 1445, pp. 297-311 (1991).

Vincent, Luc, "Grayscale Area Openings and Closings, their Efficient Implementation and Applications," *Proc. EURASIP Workshop on Mathematical morphology and its Applications to Signal Processing*, Barcelona, pp. 22-27 (May 1993).

Vincent, Luc. "Minimal Path Algorithms for the Robust Detection of Linear Features in Gray Images," *Proc. ISMM'98, International Symposium on Mathematical Morphology*, H.J.A.M. Heijamans and J. Roerdink eds., Kluwer Academic Publishers, pp 331-338 (Jun. 1998).

Vincent, Luc, "Morphological Area Openings and Closings for Grayscale Images," in Proc. NATO *Shape in Picture Workshop*, Spring Verlag, The Netherlands, pp. 197-208 (Sep. 1992).

Vincent, Luc, "Morphological Grayscale Reconstruction in Image Analysis: Applications and Efficient Algorithms" *IEEE Transactions on Image Processing*, vol. 2, pp. 176-201 (1993).

Yip et al., "Building Surfaces form Three-Dimensional Image Data on the Intel Paragon," *1996 Institution of Electrical Engineers*, Abstract (1996).

Zhang, Z., "A Neural Network for the Segmentation of Textured Images," *1996 Institution of Electrical Engineers*, Abstract (1996).

Zucker et al., "A Three-Dimensional Edge Operator" *IEEE Transactions on Pattern Analysis and Machine Intelligence*, vol. PAMI-3, No. 3 (May 1981).

Maisonneuve, F. and Schmitt, M., "An Efficient Algorithm to Compute the Hexagonal and Dodecagonal Propagation Function," *Acta Stereologica*, vol. 8/2, pp. 515-520 (Sep. 1989).

Meyer, F., "Contrast Feature Extraction," Quantitative Analysis of Microstructures in Material Sciences, Biology and Medicine, J-L Chermant Editor, Riederer Verlag, Stuttgart FRG (1978).

Talbot et al., "Advances in Directional Image Analysis using Mathematical Morphology," *Acta Stereologica* (1999).

\* cited by examiner

FIG. 1

Calculate a minimum path value at each voxel of the input 3-D seismic cube to enhance the local strength of the geologic faults and to determine their local azimuthal trend

↓

Extract a fault network skeleton from the 3-D seismic attribute cube by utilizing the minimum path value at each voxel together with the input seismic attribute 3-D cube

↓

Flood fill individual fault networks, label them, and create a vector description of the fault network skeletons

↓

Subdivide the fault network skeletons into the smallest, non-intersecting, non-bifurcating patches that lie on only one geologic fault

↓

Correlate the individual fault patches into realistic representations of geologic faults

FIG. 5

The algorithm proceeds one orientation at a time, and therefore goes through 16 iterations over the entire cube. After each iteration, the intermediate result is written to disk to achieve a memory efficient operation.

↓

For a given orientation, the algorithm starts out by reading the N+1 first slices, indexed from 0 (first horizontal slice of the cube) to N. A data structure with 2*N+1 entries, pointing to intermediate results for each slice, is then progressively filled. Initially only N+1 entries are represented in this structure.

↓

After results for the current slice have been computed, this result is written to disk. If previous orientation results have already been computed and written to disk, the pixel-wise minimum of the current result for the current slice with the intermediate result computed for this slice thus far is taken.

↓

A rotation on the aforementioned data structure so that the "middle" of this structure, that is, entry N, now points to intermediate results computed for slice number 1 of the cube is performed. An additional slice of the cube, that is, slice N+1 is read and incorporated into the structure. At this point, N+2 slices in the data structure has been computed.

↓

After this shifting has taken place in the structure, the missing intermediate results needed for each entry, and the final results for slice number 1 for the current orientation are computed.

↓

As before, results for slice 1 are written to disk and combined with previously stored intermediate results. A "rotation" is performed on the entries in the data structure, the next slice of the cube is read and incorporated to this structure.

↓

When "steady state" has been reached, that is, when 2*N+1 entries are in the data structure, each time the process proceeds down one slice and a rotation in the data structure entries is performed, a new slice is added at entry of index 2N, and a slice and its associated intermediate results, that were computed for the first entry (index 0) in the structure, are also removed.

↓

When the bottom of the cube is reached, no new slices can be added to the data structure after each rotation of its entries. The number of entries therefore decreases until there are only N+1 left in the structure. At this point, the entry of index N for the structure points to intermediate minimal path results corresponding to the last slice of the cube.

↓

When results for this last slice have been computed and written to disk, this process repeats for the next orientation, until all 16 orientations have been considered.

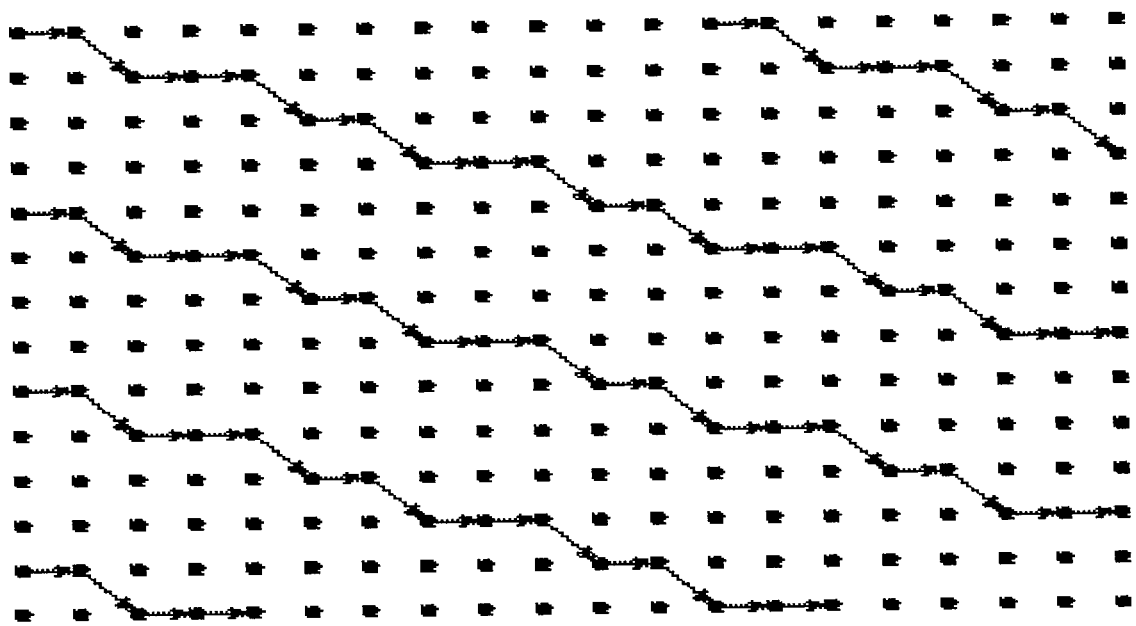
Array of unit vectors (5 in this case) providing scanning order for directional morphological operation (erosion, dilation, opening, or closing): 
FIG. 10

FIG. 16

PROCESS FOR INTERPRETING FAULTS FROM A FAULT-ENHANCED 3-DIMENSIONAL SEISMIC ATTRIBUTE VOLUME

FIELD OF THE INVENTION

The present invention relates to a process for interpreting faults from a fault-enhanced 3-dimensional ("3-D") seismic attribute volume, and more particularly, the invention relates to a computer implemented method for extracting faults from a 3-D seismic attribute cube.

BACKGROUND OF THE INVENTION AND BRIEF DESCRIPTION OF THE RELATED ART

In the search for hydrocarbons in the earth, methods for evaluating and interpreting the structure of the earth's subsurface as well as the effects of stratigraphy, lithology, and pore fluid content on geophysical data in order to relate such effects to the occurrence or presence of hydrocarbons have been developed. Seismic reflection data is traditionally acquired and processed for the purpose of imaging acoustic boundaries and seismic reflection events in the subsurface. In the field of geophysics, numerous techniques for imparting seismic wave energy into the earth's subsurface formations, recording the returning reflected seismic wave energy and processing the recorded seismic wave energy to produce seismic signals or traces have been developed. The seismic signals or traces obtained generally contain a multiplicity of information including frequency, amplitude and phase, which can be related to geology, lithology or pore fluid content of the earth's subsurface. Such features of the seismic signals are generally referred to as instantaneous attributes. Additionally, interpretative techniques generally referred to as stratigraphic interpretative analysis have been developed for analyzing seismic data and for identifying and characterizing changes in lithology, geology and pore fluid content of the earth's subsurface from recurring patterns associated with reflection events in the seismic data. Examples of such focus are Quay et al. in U.S. Pat. No. 3,899,768 and Bodine in U.S. Pat. No. 4,779,237.

Traditionally, both two-dimensional and three-dimensional seismic data was used for interpretation, however, the use of three-dimensional seismic data continues to grow. Specifically, three-dimensional seismic data provides a more detailed structural and stratigraphic image of sub-surface reservoirs than can be obtained from two-dimensional data. As a result of the increased use of three-dimensional data, oil companies have increased hydrocarbon reserve estimates, obtained cost savings from more accurate positioning of delineation and development wells, improved reservoir characterization leading to better simulation models, and increased the ability to more accurately predict future opportunities and problems during the subsequent production of a field. In addition, as an exploration tool, three-dimensional seismic data reduces the risk in drilling in structurally complex areas and lends itself to reservoir quality prediction in undrilled areas.

The principal advantage of three-dimensional over two-dimensional seismic data is that three-dimensional methodologies provide the interpreter with the ability to view seismic data in horizontal "map" form rather than being limited to vertical cross-section views. Using traditional two-dimensional methods of viewing vertical profiles, it is often difficult to get a clear and unbiased view of faults and stratigraphic features hidden in three-dimensional data. Although faults are often readily seen on individual vertical seismic cross-sections, multiple vertical cross-sections must be examined to determine the lateral extent of faulting. In addition, stratigraphic changes are difficult to detect on vertical seismic lines because of the limited profile that they present. To avoid these issues, geoscientists have traditionally utilized two kinds of seismic map displays: amplitude time-slice and seismic horizon-slices. The amplitude time-slice is a horizontal plane, at a constant time, through the three-dimensional volume, which displays the amplitude of the seismic data at that time without reference to a stratigraphic horizon. An advantage of the amplitude time-slice is that an interpreter can view geologic features in map form without having to first pick seismic events in the data. A seismic horizon slice contains useful stratigraphic information because it displays the amplitude of the seismic data along a particular geologic horizon. However, the geoscientist must "pick" a stratigraphic surface prior to generating the seismic horizon display, which can be difficult and time-consuming. This also imposes an interpretive bias on the data set and requires that the interpreter has already defined the fault framework that intersects with the horizon under consideration. The other disadvantage of horizon slices is that the results can only be obtained on isolated surfaces in the three-dimensional volume and not on the whole volume.

As a result of increased computer speed and the ability to acquire and handle larger data sets, 3-D seismic data has become widely collected, and interpreted. In addition, researchers have devised methods to enhance the 3-D seismic data for various purposes, such as enhancement of fault appearance to facilitate the manual interpretation of geologic faults. For example, derivative difference (Luo et al., U.S. Pat. No. 5,724,309), amplitude difference (Luo et al. U.S. Pat. No. 5,831,935), and coherence technique (Bahorich et al, U.S. Pat. No. 5,563,949) have all been developed for enhancement of the appearance of geologic faults. However, each of these methodologies requires the manual interpretation of the geologic faults which is still time consuming.

What is needed is a semi-automated computer-based process that reduces the time consuming nature of fault interpretation, while simultaneously increasing the level of fault detail obtained.

Crawford et al. U.S. Pat. No. 5,987,388 describes an automated method of processing a fault enhanced 3-D seismic volume to locate and interpret faults. The method includes processing of individual lateral slices of the 3-D seismic volume wherein for each lateral slice, stripe artifacts are eliminated by adjusting pixel values to account for lines that are unduly bright or dim (and thus artifacts of processing). The linear features are enhanced by applying a modified Gurney-Vanderburg algorithm, such that the intensity value of each pixel is enhanced according to the extent to which the pixels reside in a line. Detection of lines in the enhanced lateral slice is then performed by summing pixel intensities over a window at varying directions, and associating, with a center pixel, an amplitude value corresponding to the maximum sum and a direction value associated with this sum. The amplitude and direction values are then used to trace lines in the data. The tracing of lines is performed by locating a maximum pixel and examining adjacent pixels of high amplitude in directions similar to the direction values of locally maximum amplitude values. The resulting vectors are then linked among lateral slices into surfaces that are representative of geologic faults.

Neff et al., U.S. Pat. No. 6,018,498 describes another method related to a computer implemented method and apparatus for automatically picking faults in a recorded three-dimensional seismic trace data volume. The method employs test planes, which are mathematically inserted into the seismic data volume to approximate dip and azimuth of a potential fault plane surface. A large number of data points, which are selected points on the seismic traces, are defined within the seismic volume, such that each test plane positioned in the seismic volume contains data points corresponding to at least a significant portion of a trace. The method then determines a factor for each data point which is representative of the probability that the point resides on a fault plane. This probability is based on planar discontinuity and average amplitude difference between corresponding traces in adjacent parallel test planes. The method selects locations, in an x, y grid, of a strip of locations having high probability of residing on a fault surface. The strip of the selected locations is smoothed to a line and used to construct fault lineament displays in seismic sections or time slices. The fault lineaments are stored in a computer data file, and conventional, stratigraphically enhanced, or other seismic data enhanced for seismic attributes is merged with the fault lineament files to create consolidated displays to aid interpretation of the data volume.

Accordingly, it would be desirable to have a computer implemented method for extracting faults from a 3-D seismic attribute cube, which improves seismic interpretation, by reducing interpretation cycle time and interpretation bias.

SUMMARY OF THE INVENTION

The present invention provides a method for extracting geologic faults from a 3-D seismic attribute cube, the method includes the steps of calculating a minimum path value for each voxel of the 3-D seismic attribute cube; extracting a fault network skeleton from the 3-D seismic attribute cube by utilizing the minimum path values which correspond to voxels within the 3-D seismic attribute cube; flood filling the fault network to identify a plurality of fault segments, labeling the fault segments, and creating a vector description of the fault network skeleton; subdividing the fault segments into individual fault patches wherein the individual fault patches are the smallest, non-intersecting, non-bifurcating patches that lie on only one geologic fault; and correlating the individual fault patches into a representation of geologic faults.

In accordance with another aspect of the present invention, a method for extracting geologic faults from a 3-D seismic attribute cube, the method includes the steps of calculating a minimum path value for each voxel of the 3-D seismic attribute cube; extracting a fault network skeleton from the 3-D seismic attribute cube by utilizing the minimum path values which correspond to voxels within the 3-D seismic attribute cube; flood filling the fault network to identify a plurality of fault segments, labeling the fault segments, and creating a vector description of the fault network skeleton; subdividing the fault network skeleton into individual fault patches; and correlating the individual fault patches into a representation of geologic faults.

In accordance with a further aspect of the present invention, a method for extracting faults from a 3-D seismic attribute cube, the method includes the steps of reading a composite fault fragment into a 3-D lattice of finite size into a computer memory; and constructing a best-fit plane from adjacent connected points within the 3-D lattice.

In accordance with another aspect of the present invention, a method of correlating individual fault patches into realistic representations of geologic faults includes the steps of scanning individual fault patches to determine whether two individual fault patches are close to each other for further evaluation; and if the individual fault patches are determined to be close, then automatically correlating associated adjacent individual fault patches that fit a geometric criteria of co-planarity based on pre-determined parameters of minimum distance and angles between the patches.

In accordance with a further aspect of the present invention, a method for extracting faults from a 3-D seismic attribute cube, the method includes the steps of calculating a 3-D minimum path value for each voxel of the 3-D seismic attribute cube; and combining the 3-D minimum path value at each voxel with the 3-D seismic attribute cube to extract a fault network skeleton.

In accordance with another aspect of the present invention, a method of subdividing a fault segment includes the steps of flood filling a fault network to identify a plurality of fault segments, labeling the fault segments, and creating a vector description of the fault segments; and subdividing the fault segments to create the smallest, non-intersecting, non-bifurcating patches that lie on only one geologic fault.

In accordance with a further aspect of the present invention, a method of identifying fault segments from a fault network includes the steps of providing a fault network having a plurality of fault segments; using an adjacency list to merging fault patch fragments which contain voxels in common; labeling the fault segments; and creating a vector description of the fault segments.

In accordance with another aspect of the present invention, a computer-readable medium containing executable code for extracting geologic faults from a 3-D seismic attribute cube, which when executed performs procedures of calculating a minimum path value for each voxel of the 3-D seismic attribute cube; extracting a fault network skeleton from the 3-D seismic attribute cube by utilizing the minimum path values which correspond to voxels within the 3-D seismic attribute cube; flood filling the fault network to identify a plurality of fault segments, labeling the fault segments, and creating a vector description of the fault network skeleton; subdividing the fault segments into individual fault patches wherein the individual fault patches are the smallest, non-intersecting, non-bifurcating patches that lie on only one geologic fault; and correlating the individual fault patches into a representation of geologic faults.

In accordance with a further aspect of the present invention, a computer-readable medium containing executable code for extracting geologic faults from a 3-D seismic attribute cube, which when executed performs procedures of calculating a minimum path value for each voxel of the 3-D seismic attribute cube; extracting a fault network skeleton from the 3-D seismic attribute cube by utilizing the minimum path values which correspond to voxels within the 3-D seismic attribute cube; flood filling the fault network to identify a plurality of fault segments, labeling the fault segments, and creating a vector description of the fault network skeleton; subdividing the fault network skeleton into individual fault patches; and correlating the individual fault patches into a representation of geologic faults.

In accordance with another aspect of the present invention, a computer-readable medium containing executable code for extracting faults from a 3-D seismic attribute cube, which when executed performs procedures of reading a composite fault fragment into a 3-D lattice of finite size into a computer memory; and constructing a best-fit plane from adjacent connected points within the 3-D lattice.

In accordance with a further aspect of the present invention, a computer-readable medium containing executable code of correlating individual fault patches into realistic representations of geologic faults which when executed performs procedures of scanning individual fault patches to determine whether two individual fault patches are close to each other for further evaluation; and if the individual fault patches are determined to be close, then automatically correlating associated adjacent individual fault patches that fit a geometric criteria of co-planarity based on pre-determined parameters of minimum distance and angles between the patches.

In accordance with another aspect of the present invention, a computer-readable medium containing executable code for extracting faults from a 3-D seismic attribute cube, which when executed performs procedures of calculating a 3-D minimum path value for each voxel of the 3-D seismic attribute cube; and combining the 3-D minimum path value at each voxel with the 3-D seismic attribute cube to extract a fault network skeleton.

In accordance with a further aspect of the present invention, a computer-readable medium containing executable code of subdividing a fault segment which when executed performs procedures of flood filling a fault network to identify a plurality of fault segments, labeling the fault segments, and creating a vector description of the fault segments; and subdividing the fault segments to create the smallest, non-intersecting, non-bifurcating patches that lie on only one geologic fault.

In accordance with another aspect of the present invention, a computer-readable medium containing executable code of identifying fault segments from a fault network which when executed performs procedures of providing a fault network having a plurality of fault segments; using an adjacency list to merging fault patch fragments which contain voxels in common; labeling the fault segments; and creating a vector description of the fault segments.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 1 is a flow chart illustrating the general process for interpreting faults from a fault-enhanced 3-dimensional seismic attribute cube in accordance with the present invention;

FIG. 5 is a flow chart illustrating the minimum path algorithm in accordance with the present invention;

FIG. 10 is an image illustrating a directional scanning of images along a predefined direction, characterized by an array of unit vectors;

FIG. 16 is an image illustrating an extremities of candidate fault lines;

DETAILED DESCRIPTION OF THE PREFERRED EMBODIMENTS

Figure 2:
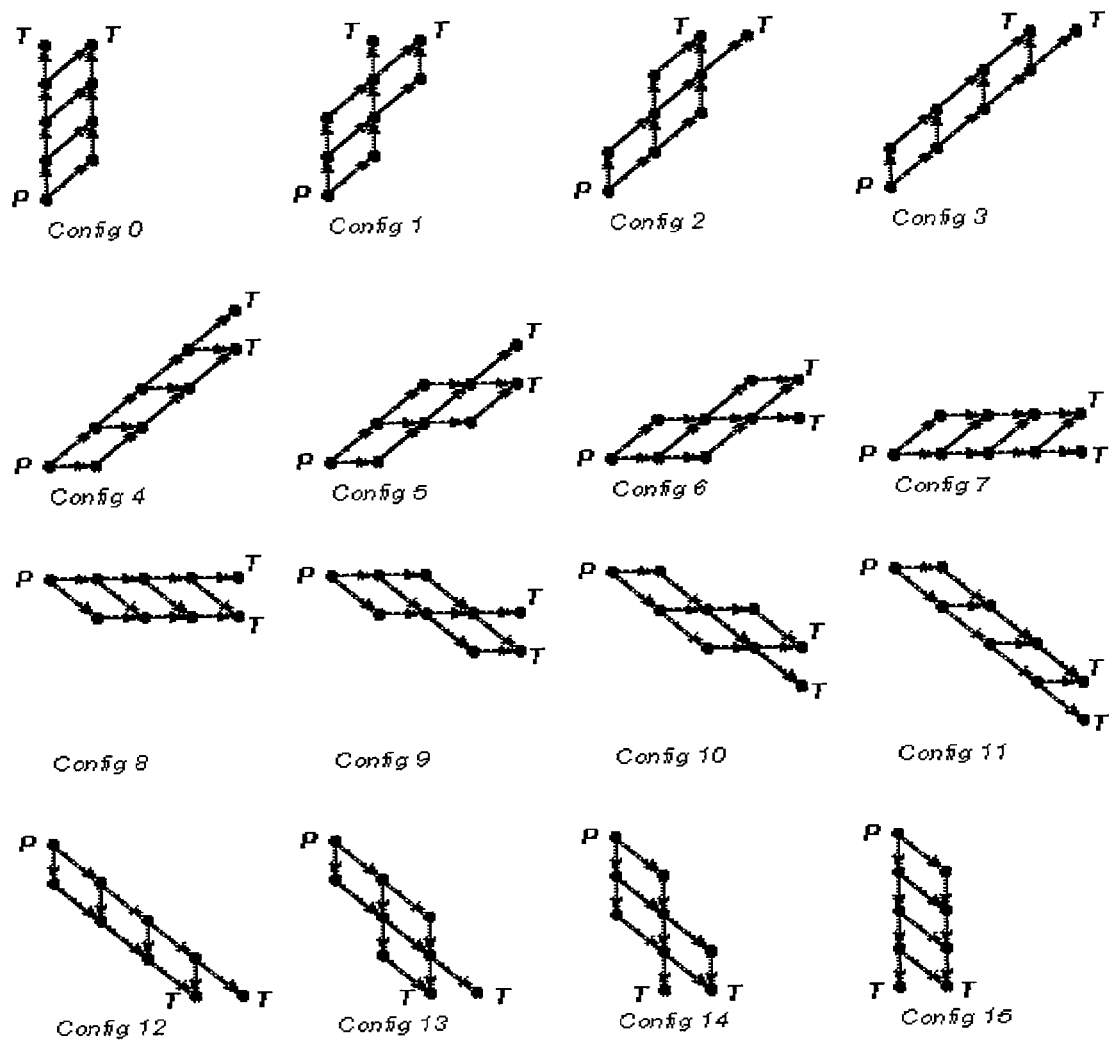
FIG. 2 is a chart of the 16 orientation configurations used in calculating the minimal path in accordance with the present invention.

The present invention is directed to a semi-automated process for interpreting faults from a fault-enhanced 3-D seismic attribute cube. The process operates in three dimensions on groups of time or horizontal slices throughout the 3-D seismic cube. The faults in the input data are represented by either the high or the low end of the seismic attribute range.

As shown in FIG. 1, the general process for interpreting faults from a fault-enhanced 3-D seismic attribute cube has five distinct processing steps. The first four steps are automatic. The last step is semi-automatic. The steps are as follows:

Step 1—Calculate a minimum path value at each voxel of the input 3-D seismic cube to enhance the local strength of the geologic faults and to determine the local azimuthal trend of any fault passing through that voxel;

Step 2—Extract a fault network skeleton from the 3-D seismic attribute cube by utilizing the minimum path value at each voxel together with the input seismic attribute 3-D cube;

Step 3—Flood fill individual fault networks, label them, and create a vector description of the fault network skeletons;

Step 4—Subdivide the fault network skeletons into the smallest, non-intersecting, non-bifurcating patches that lie on only one geologic fault; and Step 5—Correlate the individual fault patches into realistic representations of geologic faults.

Step 1—Enhancing the Faults and Determining the Azimuth

Step 1 of the process enhances the local strength of the geologic faults and determines their local azimuthal trend. The operation begins with input of a fault-enhanced 3-D seismic attribute cube. The fault-enhanced 3-D seismic cube can either be generated by Chevron's patented program, EDGE, U.S. Pat. Nos. 5,724,309 and 5,831,935, which are incorporated herein by reference in their entirety or by any of a variety of suitable processing methods that may be available. A value that corresponds to the cost of a minimum path that passes through that voxel within certain constraints is then calculated. The process is preformed in three-dimensions using voxels ("volume elements") to arrive at the minimum path.

The minimum path value is calculated using an algorithm which assigns a gray level, which corresponds to the cost of the minimum path going through each voxel within certain constraints. The process looks for fault lines which are locally straight. Therefore, only paths which do not deviate from a straight line by more than a few degrees are considered. The minimum path is calculated using a two-step approach. The first step is to define the orientation classes, characterized by the 26 possible orientations or neighbors of the 3-dimensional grid. Each class defines a cone or pie slice of orientation, and specifies an orientation tolerance of approximately plus or minus a specified number of degrees. In order to be considered, a path must fall entirely with one of the orientation classes as defined by the process.

The second step of the minimum path algorithm extends the length of the 3-dimensional orientation classes by operating on a multiple of the pixel classes. This operation has an overall effect of connecting the dark elongated structures in the image, or fault lines.

Step 1a—Scaling

The operation first optionally allows the user to correct for the X and Y voxel size in the case of non-square voxels. This is useful if seismic data has been collected such that the spacing between data points is different in the x and y directions. This operation will generate additional voxels by nearest neighbor interpolation in the X and/or Y directions. This operation will generate additional voxels by nearest neighbor interpolation in the X and/or Y directions. The number of voxels created is dependent on the scaling factor. For example, a scaling factor of 2 will add one new voxel between each existing voxel, while 3 would add two new voxels between each existing voxel.

Step 1b—Minimum Path Algorithm

The goal of Step 1b is to assign to each voxel in the three dimensional seismic cube, a value that corresponds to the cost of a minimum path that passes through that voxel, within certain constraints. A path of length n in the three dimensional grid is defined as a connected list of voxels ($V_1$, $V_2$, ..., $V_n$). The connectivity notion assumes that each voxel can have up to 26 neighbors, that is, all the neighbors, including the diagonal orientation of the 3-D grid. The cost of a path is taken to be the sum of all the values of the voxels constituting the path.

Generally, the fault lines sought are locally straight. Therefore, when considering the paths that go through a certain voxel, only paths that do not deviate from a straight line by more than a few degrees are considered. This is achieved by requiring the considered paths to be fully within a certain orientation class.

For the purpose of description of the algorithm, the algorithm will be discussed as if operating in only 2 dimensions, wherein the horizontal slices of the seismic cube are considered independently of each other. The 2-dimensional method will then be compared to the three-dimensional algorithm that is actually used in calculating the minimal path.

To track the approximately straight faults, a two-tier approach is used in calculating the minimum path. First, 16 orientation classes are defined, characterized by the local configurations as shown in FIG. 2. Pixel "P" in FIG. 2 marks the location of the pixel for which the cost is being calculated. Pixels "T" in FIG. 2 mark the termination pixels of the possible paths for each orientation class. The arrows going from pixel to pixel represent, for each pixel location, the possible route of the minimum path. In a preferred embodiment, the path length in this first tier of the minimum path algorithm is four pixels long. However, it may be appreciated that the path length can be any number of pixels long.

Each class defines a cone or pie slice of orientation, and specifies an orientation tolerance of approximately plus or minus 5.5 degrees. Accordingly, in order to be considered, a path must fall entirely within one of these 16 orientation classes. As shown in FIG. 2, within each orientation class there are multiple routes from pixel "P" to one of the termination pixels "T." In this example, all possible 4-pixel routes from "P" to one of the termination pixels "T" are considered to determine the cost of the minimum path.

The second tier of the minimum path algorithm extends the length of the four-pixel orientation classes by operating on multiples (N) of these four-pixel classes. N is a fixed parameter that is supplied as input to the algorithm. Effectively, paths of length 4*N+1 are considered. In a preferred embodiment, N has a value of 5, however, it may be appreciated that the value of N can range from 1 to 10 or larger. With N equal to 5, all the paths considered will be of length 4*5+1=21 pixels.

In order to define these 16 orientation classes, local neighborhoods of size 4 around any pixel are considered. However, it may be appreciated that the same method could easily be adjusted to larger or smaller local neighborhoods, which would yield more or less stringent orientation requirements for considered paths.

For the set of paths around a given pixel (voxel) p, in a given orientation class θ (Config. 0 through 15), the set of paths examined by specifying where pixel p can be located along any path are considered.

Numbering the pixels in the paths from 0 to 4*N (there are 4*N+1 pixels in considered paths, as mentioned previously), p is constrained to be the (4*i)-th pixel in the path, where i can have value 0, 1, ..., N.

Figure 3:
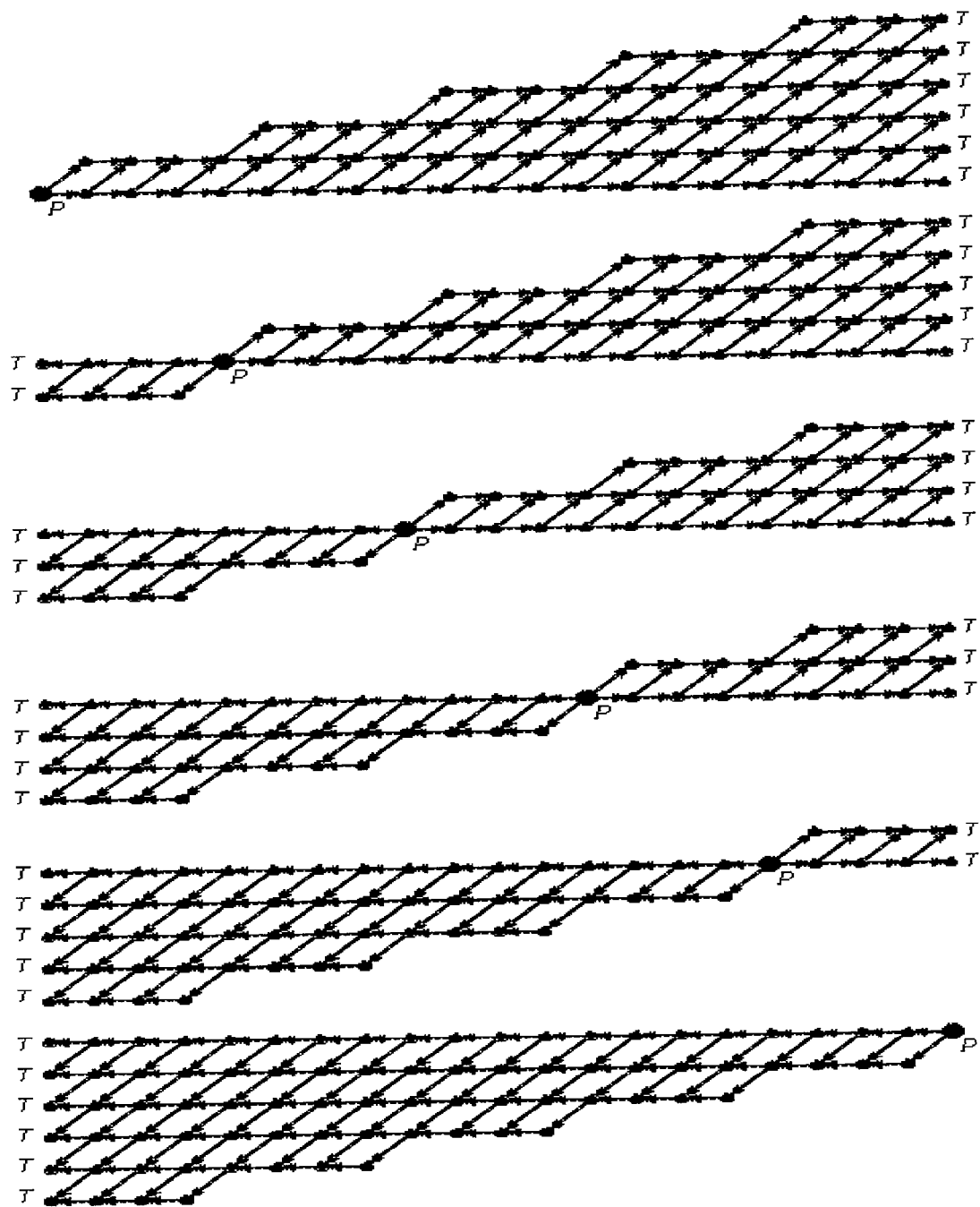
FIG. 3 is a chart of the different positions that pixel P can have along a path of length 4*N+1 (here N=5), for a given orientation class (characterized here by configuration 7 of FIG. 2)

In other words, N+1 possible positions of pixel p along the considered paths are specified. This is illustrated by FIG. 3. Note that in FIG. 3, the paths are drawn to go left and right from p. As before, the arrows going from pixel to pixel represent, for each pixel location, the possible route of the minimum path.

For purposes of explanation, FIGS. 2 and 3 are shown in two-dimension, however, as mentioned earlier, the paths considered are in fact three-dimensional. A given orientation class θ (Con*fig.* 0 through 15), and a given value of parameter N (for example 5) defines the minimum path. In operation, voxel p, which belongs to a given horizontal slice of the cube is considered. These slices will be called S1, S2, . . . , Sp. Let q, where 1<=q<=p is the index of the slice voxel p belongs to. In the minimal paths calculations, N slices are considered below Sq and N slices above Sq. In other words, 2*N+1 horizontal slices of the seismic cube are considered.

Figure 4:
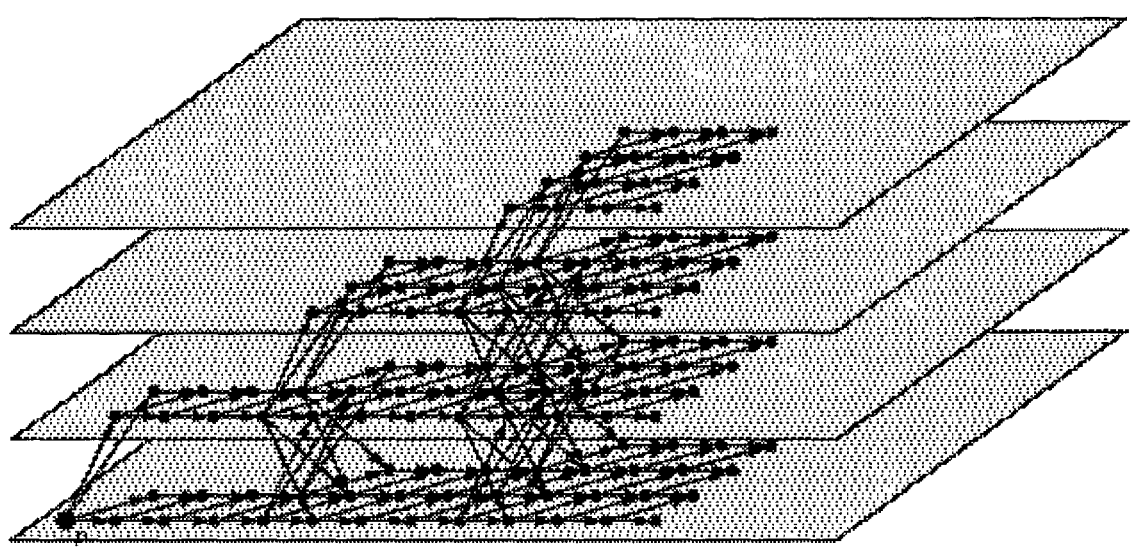
FIG. 4 is a chart of all the possible paths for a given orientation (defined by configuration 7 of FIG. 2), of length N*4+1=13 (N=3 in this example)

The paths considered are bound, in the horizontal orientation, by the same directional constraints characterized above. However, for every four pixels, the path can also "jump" from one slice to the one immediately above or immediately below. Further, with a value of N=5, the path can therefore move up or down by as many as 5 horizontal slices, over the full length of a valid path of length 4*N+1. This is shown in FIG. 4, wherein N=3. Note that for simplicity of FIG. 4:
1. Only the configuration of orientation 7 (see FIG. 2) is shown. However, in practice, all 15 orientations are considered.
2. Only the paths originating on p are shown. In practice, as explained earlier, N is also consider (N=3 in this case), including other possible positions for p in the path.
3. The path going "up" from p is shown, but in practice, paths wherein N=3 slices "below" p are also considered.

At this point, the exact set of paths are established that are examined around each voxel of the seismic cube. As previously set forth, the goal is to assign to each voxel of the cube the cost of the path of minimal cost going through the voxel. The algorithm computes this cost efficiently as set forth below using the following basic steps:
1) Pixelwise minimum operation between horizontal slices containing intermediate results; and
2) 2D minimal path computations in one of 16 possible orientations. Such steps are implemented via an extremely efficient sequential algorithm (aka recursive algorithm) requiring a single pass through the image, either in raster order or in reverse-raster order depending on the orientation.

As shown in FIG. 5, the detailed elements of the minimum path algorithm are as follows:
Step 1—The algorithm proceeds one orientation at a time, and therefore goes through 16 iterations over the entire cube. After each iteration, the intermediate result (for directions 0, 1, . . . , i) is written to a disk to achieve a memory efficient operation.
Step 2—For a given orientation, the algorithm starts out by reading the N+1 first slices, indexed from 0 (first horizontal slice of the cube) to N. A data structure with 2*N+1 entries, pointing to intermediate results for each slice, is then progressively filled. Initially only N+1 entries are represented in this structure.
Step 3—After results for the current slice have been computed, this result is written to disk. If previous orientation results have already been computed and written to disk, the pixel-wise minimum of the current result for the current slice with the intermediate result computed for this slice thus far is taken.
Step 4—A rotation on the aforementioned data structure so that the "middle" of this structure, that is, entry N, now points to intermediate results computed for slice number 1 of the cube is performed. An additional slice of the cube, that is, slice N+1, is read and incorporated into the structure. At this point, N+2 slices in the data structure have been computed.
Step 5—After this shifting has taken place in the structure, the missing intermediate results needed for each entry, and the final results for slice number 1 for the current orientation are computed.
Step 6—As before, results for slice 1 are written to disk and combined with previously stored intermediate results. A "rotation" is performed on the entries in the data structure, the next slice of the cube is read and incorporated to this structure.
Step 7—When "steady state" has been reached, that is, when 2*N+1 entries are in the data structure, each time the process proceeds down one slice and a rotation in the data structure entries is performed, a new slice is added at entry index 2N, and a slice and its associated intermediate results that were computed for the first entry (index 0) in the structure are also removed.
Step 8—When the bottom of the cube is reached, no new slices can be added to the data structure after each rotation of its entries. The number of entries therefore decreases until there are only N+1 left in the structure. At this point, the entry of index N for the structure points to intermediate minimal path results corresponding to the last slice of the cube.
Step 9—When results for this last slice have been computed and written to disk, this process repeats for the next orientation, until all 16 orientations have been considered.

Optionally, as results for each of the 16 possible orientations are computed, combined with previously obtained intermediate results, and written to disk, the algorithm extracts for each pixel the dominant "azimuth" at this location. The dominant "azimuth" is defined as the orientation (characterized by a number from 0 to 15) for which the path of the minimal cost was found. The resulting azimuth image is optionally used in later steps, when extracted structures are filtered and connected using a "directionally variant morphological opening."

The intermediate results from the minimum path algorithm are progressively updated on disk (or wherever they are stored) as follows: once computations for orientation θ with 0<=θ<=14 are completed, computations for orientation θ+1 are then computed. If S is the current slice, Sm is the result of the minimal path computation for this slice, in orientation θ+1. For this slice S, an intermediate minimal path image Sr is stored (on disk), along with an optional intermediate azimuth image Sa. This intermediate step is updated as follows:
For each pixel p:
  If Sm(p)<Sr(p)
    Assign Sr(p) value Sm(p)
    If Azimuth image Sa exists, then
      Assign Sa(p) value θ+1

In the event that the voxel of interest is too close to the edge of the cube to allow summing out to the desired distance, an approximation can be obtained by "mirroring" the image on all four sides. Since the basic step of the algorithm (the recursive propagation of path values) involves a neighborhood that is bigger than the traditional 3×3 neighborhood, this approach for handling edge pixels gives better results than simple replication of first and last line, and first and last column of the image.

A sample time slice from a 3-D seismic cube (FIG. 6) will be used to illustrate the steps of the algorithm. The dark elongated structures in FIG. 6 are the fault lines that the process seeks to automatically identify.

Figure 6:
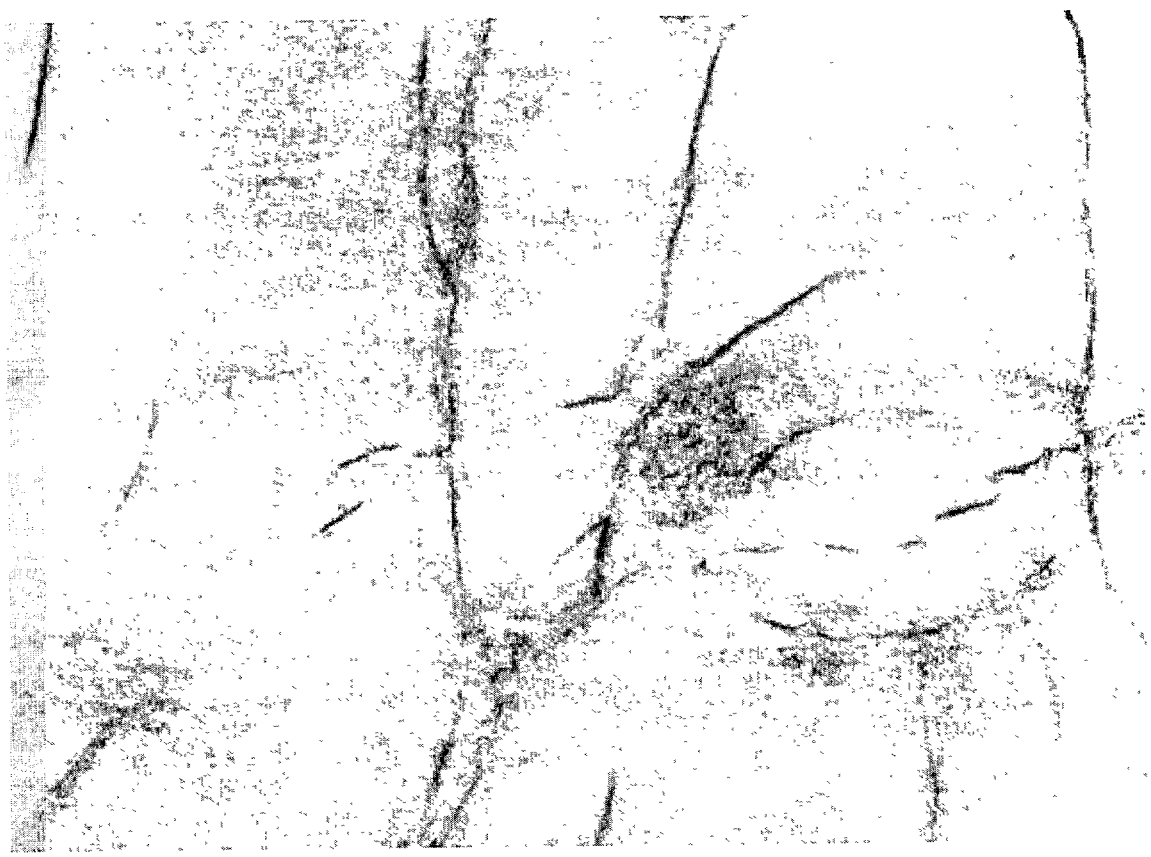
FIG. 6 is an image illustrating a sample slice of a seismic cube.
Figure 7:
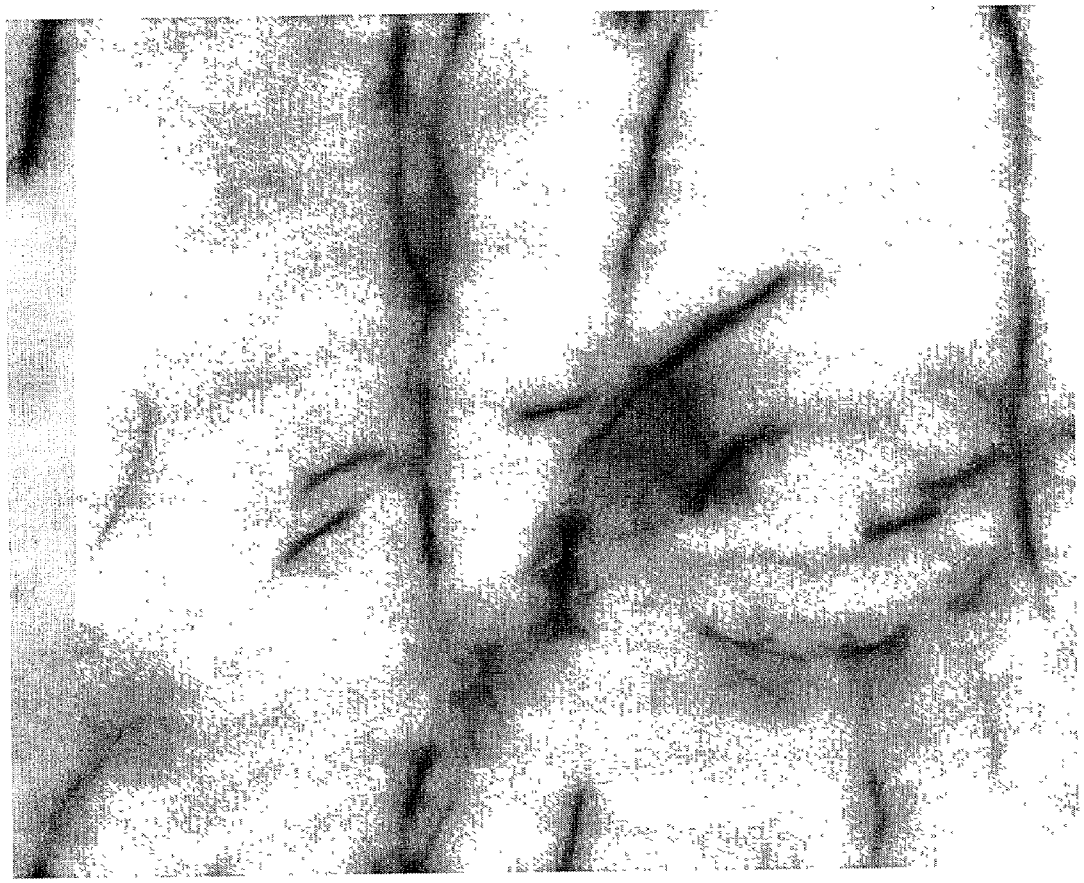
FIG. 7 is an image illustrating a minimal path image that corresponds to FIG. 6.

FIG. 7 shows the result of the minimal path algorithm image as applied to FIG. 6. In this particular case, it was applied to the entire cube, however the result shown in FIG. 7 is for the slice shown in FIG. 6. The minimal path algorithm assigns each pixel a gray level corresponding to the cost of the minimal path going through this pixel, within the constraints entered by the user. The operation has an overall effect of connecting the dark elongated structures in the image, or the fault lines.

Figure 8:
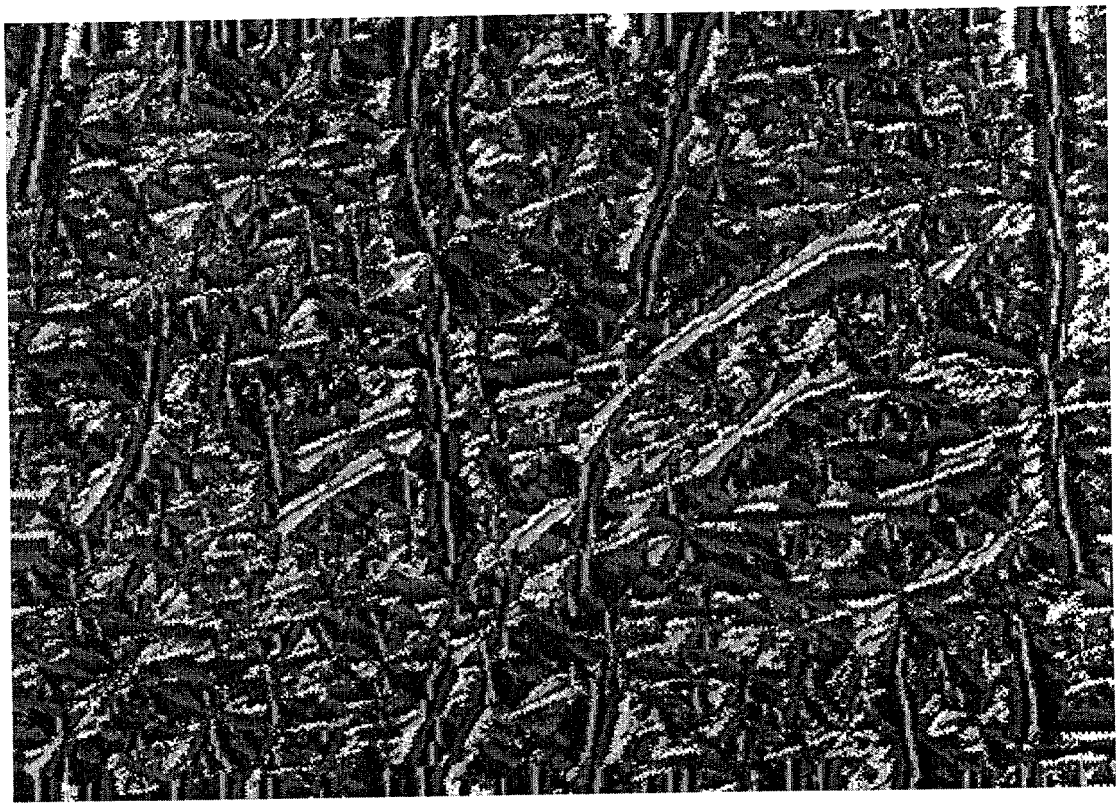
FIG. 8 is an image illustrating an azimuth image corresponding to FIGS. 6 and 7.

FIG. 8 shows the azimuth image corresponding to FIGS. 6 and 7. The 16 shades of gray represent the 16 possible orientations found in the image.

Step 2—Extracting the Fault Network Skeletons

Once the minimum path has been calculated, the process combines the minimum path value at each voxel with the data from the seismic attribute 3-D cube to extract the fault network skeleton. The fault network skeleton is obtained by performing directionally variant filtering, inverse top hat filtering, a threshold and clean up of the images from the inverse top hat operation, and skeletonization. The skeletonization is obtained by determining if the value of the minimum path is greater than a defined threshold. If the value is greater than the defined threshold, then the voxel is assigned a finding of "fault," or if less than the threshold, "no fault."

In Step 2, the original fault-enhanced cube along, the minimum path cube created in Step 1, and optionally the azimuth cube created in Step 1, are passed through a sequence of 2-D image-processing calculations to create a cube that contains skeletonized, that is one voxel thick, fault fragments.

The sequence of image-processing steps is carried out by a tool called "faults," and its behavior can be finely controlled through an extensive set of command line options. This set of command line options is printed in Appendix A.

This sequence begins by reading the first time slice of the minimum path cube from disk into computer memory. The steps are then as follows:

Step 2a—Scaling

The operation first optionally allows the user to correct for the X and Y voxel size in the case of non-square voxels. This operation will generate additional voxels by nearest neighbor interpolation in the X and/or Y directions. If the corresponding scaling option was selected in Step 1a, then it must also be selected in Step 2a.

Step 2b—Directionally Variant Filtering

For each voxel of the current minimum path slice in computer memory, an optional directional filter is applied to the minimum path data values to improve the connections between adjacent minimum path values. The directional filter is applied along the azimuth previously determined in Step 1, which is considered to be the local azimuth of the "best" minimum path. This azimuth value is then read from the azimuth cube, which was optionally created in Step 1.

The default value for the size of this directionally variant opening operation is 0, which means that it is turned off. Accordingly, in most cases, this operation is not required. However, when this operation is performed on the minimal path image, the result replaces the original minimal path image. In addition, the latter is no longer used in the rest of the process.

Figure 9:
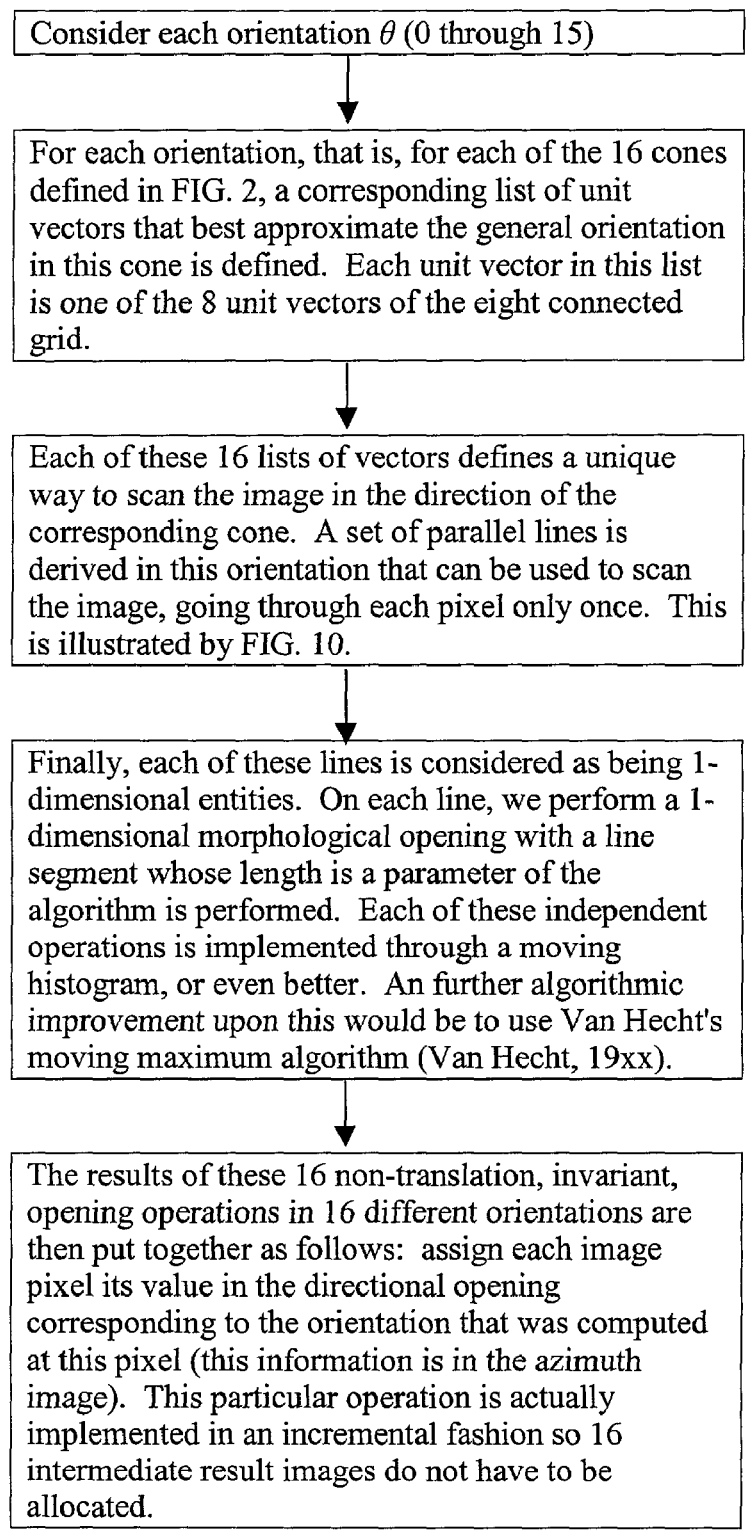
FIG. 9 is a flow chart illustrating the optional directionally variant filter algorithm in accordance with the present invention.

As shown in FIG. 9, the optional directionally variant filter algorithm works as follows:

Step 1—Consider each orientation θ (0 through 15)

Step 2—For each of the 16 orientations or cones defined in FIG. 2, a corresponding list of unit vectors that best approximate the general orientation of the cone is defined. Each unit vector in this list is one of the 8 unit vectors of the eight-connected grid.

Step 3—Each of these 16 lists of vectors defines a unique way to scan the image in the direction of the corresponding cone. A set of parallel lines is derived in this orientation that can be used to scan the image, going through each pixel only once. This is illustrated by FIG. 10.

Step 4—Finally, each of these lines is considered as being 1-dimensional entities. On each line, a 1-dimensional morphological opening with a line segment whose length is a parameter of the algorithm is performed. Each of these independent operations is implemented through a moving histogram. Alternatively, the morphological opening is performed in a manner that is described in detail in Van Hecht, "Fast maxima and minima over moving window," which is incorporated herein by reference.

Step 5—The results of these 16 non-translation, invariant, opening operations in 16 different orientations are then put together by: assigning each pixel its value in the directional opening corresponding to the orientation that was computed at this pixel (this information is in the azimuth image). This particular operation is implemented in an incremental fashion so 16 intermediate result images do not have to be allocated.

Step 2c—Top Hat Filter

The next step in the process consists of extracting the valleys of the previous, optionally filtered, minimal path image. The fault lines will appear as narrow valleys in this image. A morphological top hat operation is used to extract the valleys. The morphological top hat operation is one of the classic operations of mathematical morphology, and was originally proposed in the 1970's by F. Meyer. See Meyer, F., "Contrast Feature Extraction," *Quantitative Analysis of Microstructures in Material Sciences*, Biology and Medicine, J-L Chermant Editor, Riederer Verlag, Stuttgart FRG (1978). It may be appreciated, however, that any suitable mathematical top hat morphology may be used.

In a preferred embodiment, the algorithm is an inverse top hat, also known as "bottom hat" operation. This operation relies on a morphological closing instead of a morphological opening. The inverse top hat includes the following steps:

1) Minimal path image resulting from previous steps is processed via a morphological closing with a circular structuring element S. The image is first dilated with S, and then eroded with S. The element S is chosen to be the best discrete approximation of a disk, with a default radius of about 5.0.

2) The original image is subtracted from the result of this closing operation wherein the resulting image is the top hat image.

Figure 11:
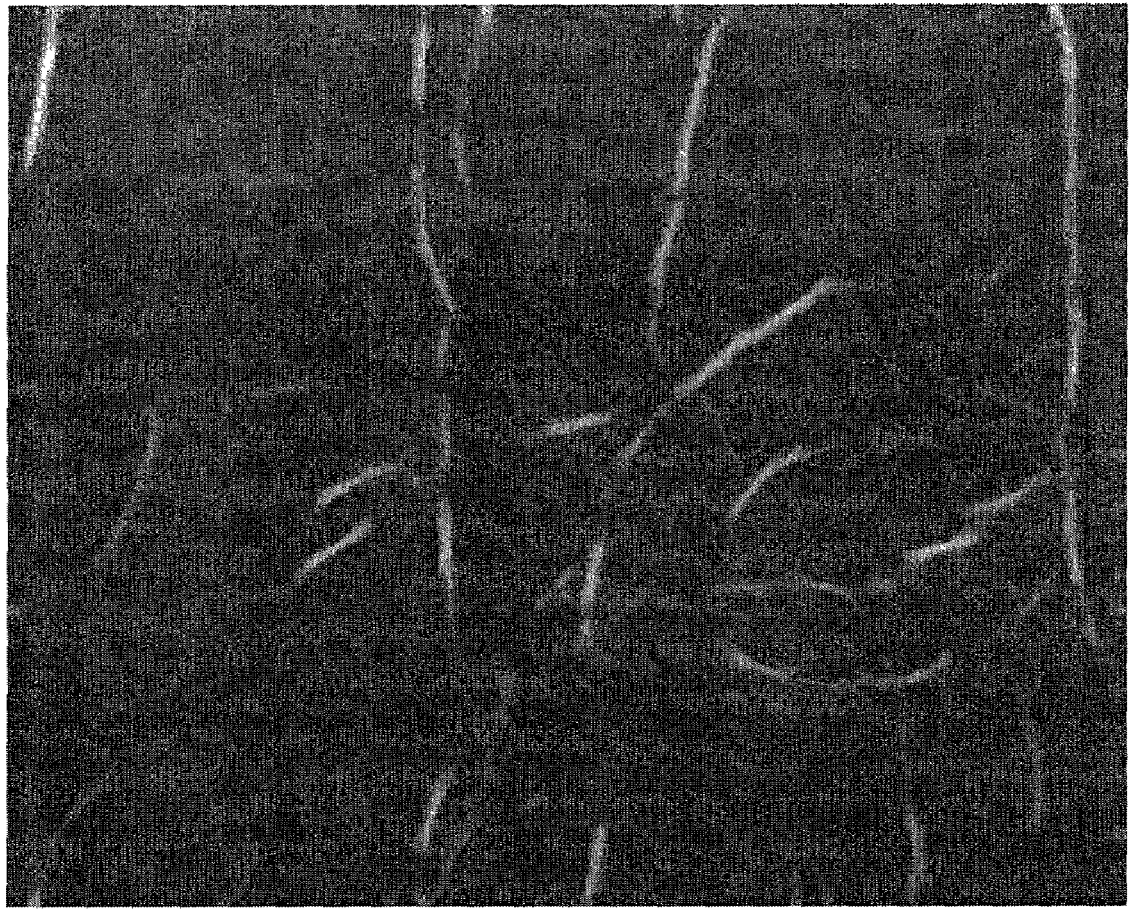
FIG. 11 is an image illustrating a result of an inverse top hat operation.

The resulting image of the inverse top hat filter is shown in FIG. 11.

Step 2d—Threshold and Clean-Up of Top Hat Image

In the algorithm flow, the top hat image resulting from the previous steps is saved for future use. In addition, the image is also binarized and cleaned-up. This will result in a very rough first estimate of a fault line location for the particular slice.

Figure 12:
FIG. 12 is an image illustrating the pixels extracted by a thresholding operation.

In addition to selecting structures based on their size and shape, the top hat operation has the additional effect of normalizing image background. Therefore, a very elaborate binarization method is not required at this stage, and a simple thresholding is used. Those pixels in the top hat image with a value greater than a user-defined threshold are set to 1 in an output image, and the others are set to 0. In the resulting binary image, the pixels with value 1 can be considered as belonging to "candidate fault lines." The pixels extracted by this thresholding operation are shown in FIG. 12.

The binary image resulting from this thresholding operation is then filtered as follows:

1. A small area opening is used to remove all the small connected objects present in this image. Basically, this operation extracts every connected component (8-connected object) in the image, and removes it if its total number of pixels (that is, its area) is less than a given size threshold. In a preferred embodiment, the default size for this operation is 50 pixels. However, it may be appreciated that default size can be adjusted to a larger or a smaller number of pixels.
2. This area opening step is followed by an optional morphological closing. This operation can on some occasions be useful to bridge small gaps in the fault lines. However it is somewhat redundant with the "locally variant opening" operation described in step 2.2. By default, this operation is not performed in the preferred embodiment.

Figure 13:
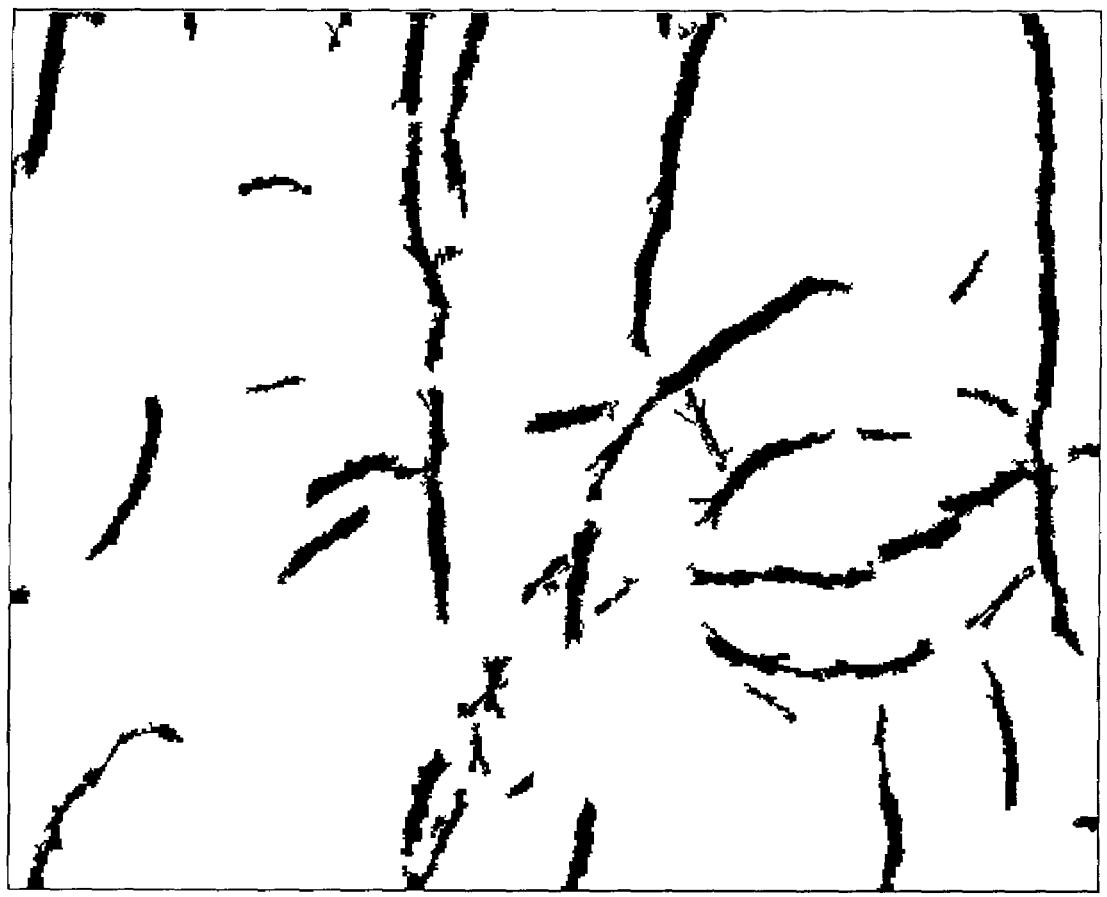
FIG. 13 is an image illustrating a binarized image of fault lines after thresholding and filtering steps.

The binary image resulting from this cleaning step is shown in FIG. 13.

Step 2e—Skeletonization

Each remaining group of non-zero surviving voxels are subsequently reduced to their central, one-voxel thick 3-D form or skeleton. Skeletonization is an operation that has been extensively studied by large numbers of image analysis researchers such that there are thousands of technical papers dealing with skeletons, their idiosyncrasies, and algorithms to best compute them. However, every problem requiring the use of some form of skeletonization is different, so customization is almost always required. Thus, the present situation is no exception. In a preferred embodiment, a straightforward skeletonization process is not used because of at least two main drawbacks:

1. The skeletal lines would often not be optimally located along the very center of the fault lines. This is because some of the preprocessing steps that were used so far can result in the binarized faults (See FIG. 13) being slightly shifted with respect to the original fault lines. Therefore, the skeletonization process, which would extract the "medial axes" of these binarized faults, may give a skewed result.
2. The resulting skeleton image would exhibit an overly large number of irrelevant branches corresponding to small irregularities of the object boundaries (For example, See FIG. 14). A so-called pruning step could be used to partially remedy this problem. However this would not be ideal either since traditional pruning proceeds by removing all the end pixels of a skeleton, and then iterating this process until the desired effect has been achieved. Therefore, this process cannot discriminate between "good" branches, marking relevant geological features, and the branches that correspond to boundary irregularities. As the latter are being removed, the relevant skeletal branches are often severely shortened, which is undesirable.

Figure 14:
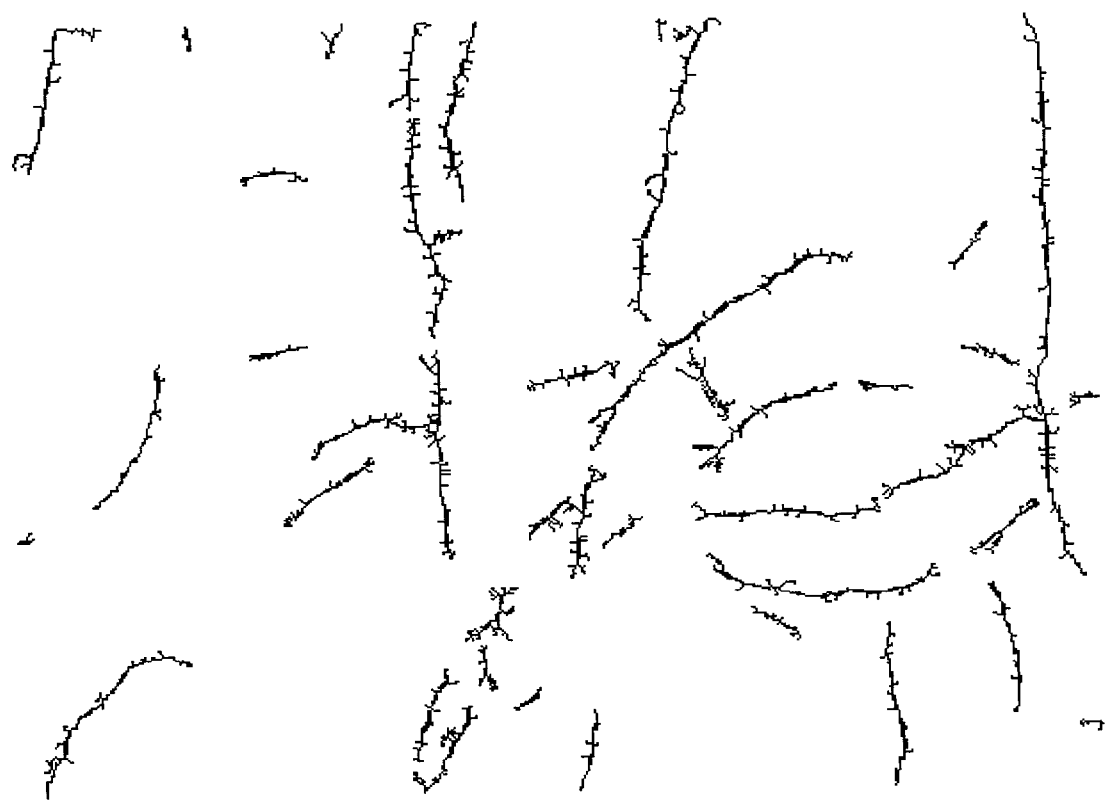
FIG. 14 is an image illustrating an example of poor quality skeletonization of FIG. 13, using a standard skeletonization approach.

FIG. 14 shows an example of poor quality skeletonization of FIG. 11, using a standard skeletonization approach.

Accordingly, in a preferred embodiment, the method is based on the prior identification of relevant branches in the image of binarized fault lines. This is done using an image analysis tool called the "propagation function," as disclosed by Vincent, Luc, "Morphological Grayscale Reconstruction in Image Analysis: Applications and Efficient Algorithms," *IEEE Transactions on Image Processing*, Vol. 2, pp. 176–201 (April 1993), which is incorporated herein by reference in its entirety. This operation processes every connected component in the image independently. For every pixel p of a connected component C, it assigns p its geodesic distance to the farthest pixel of C. In every connected component, the pixels with locally a larger propagation value than that of their neighbors will be typically located at the extremity of a branch or other elongated part of the object C.

Figure 15:
FIG. 15 is an image illustrating a propagation function of binarized fault line image from FIG. 13.

While the operation and algorithm described by Maisonneuve, F. and Schmitt, M., "An Efficient Algorithm to Compute the Hexagonal and Dodecagonal Propagation Function," *Acta Stereologica*, Vol. 8/2, pp. 515–520 (September 1989), requires the connected components to be "simply connected," that is to have no holes for the used connectivity, the algorithm disclosed in the present invention does not have such limitations. The propagation function of FIG. 13 is shown in FIG. 15. In FIG. 15, the larger connected components are overall brighter than the smaller ones. Also, for every connected component, the brightest pixels are located toward the branch extremities.

The relevant extremities of the candidate fault lines as constrained maxima of the propagation function are then extracted. This process accounts for the fact that maxima of the propagation function are typically located on object extremities, but that some maxima are also due to small irregularities in the object boundaries. The concept of "dynamics of maxima" as described by Grimaud, Michael, "A New Measure of Contrast: Dynamics," *Proc. SPIE Image Algebra and Morphological Imaging Processing*, pp. 292–305, (July 1992), which is incorporated herein by reference, is used at this stage to identify the relevant maxima and use them as object extremities. More specifically:

From the propagation function image I, a constant c is subtracted. That is, from every pixel p of image I, the constant c is subtracted. The result is image J=I−c. The value of c is typically taken to be equal to 5 or 6, but can be adjusted to improve algorithm performance on certain types of images.

A grayscale reconstruction operation as disclosed by Vincent, Luc, "Efficient Computation of Various Types of Skeleton," *Proc. SPIE Medical Imaging V*, Vol. 1445, pp. 297–311 (1993), is then used whereby original propagation function image I is "reconstructed" from image J. In other words, image J is iteratively dilated under the constraint that it remains bounded by I at every step of the process. This process converges in a bounded number of iterations, resulting in reconstructed image R.

The regional maxima of image R are then extracted to provide a set of extremities for candidate fault lines, as shown in FIG. 16.

These extremities are used in turn to constrain the skeletonization process wherein connected component (i.e., candidate fault lines) are considered one after the other. For each one, the previously extracted extremities are used as "anchor points" in a skeletonization process that proceeds through successive homotopic iterations: starting from the outer layer of pixels and going inward, pixels are iteratively removed from the considered connected component. At any given time in the process, a pixel p can be removed if and only if:

1. p is not itself a anchor point
2. removing p would not alter the "homotopy" (or the connectivity) of the object being skeletonized. In other words, removing p does not result in the object getting broken into several pieces.

This process is described in detail in Vincent, Luc, "Efficient Computation of Various Types of Skeletons," *Proc. SPIE, Medical Imaging V*, Vol. 1445, pp. 297–311 (1991), which is incorporated herein by reference in its entirety. However, a further refinement is used wherein, instead of "peeling" pixels one layer at a time, starting from boundary pixels, the original grayscale fault image (slice) is used to further constraint the skeletonization process. The grayscale values of pixels in the original slice are then used to determine the order in which pixels are scanned when skeletonizing a given candidate fault line.

The skeletonizing is performed by an initialization step equivalent to the one described in Vincent Luc, "Efficient Computation of Various Types of Skeletons," wherein boundary pixels are placed in a queue of pixel pointers. However, the queue used is a special data structure that enables the user to keep track of the "priority level" of each of its elements. Boundary pixels are initially placed in the queue with a priority level equal to their gray level in the original slice. Thus, brighter (less fault-like) pixels will be considered first. After each pixel p is considered, its neighbors that have not been scanned are placed on the queue. The priority level a neighbor q of p is given when it is placed on the queue is equal to the minimum between the value of p and the value of q in the original slice. At each step in the scanning process, the pixel with greatest priority is extracted from the queue structure and processed. This is done until stability is reached.

This refinement enables the user to control the construction of the skeleton and guarantees that the skeleton will be located along the deepest (i.e., darkest, most fault-like) valley lines of the original image while connecting the previously extracted extremities, preserving connectivity, and achieving unit-pixel thickness. In an alternative embodiment, if greater smoothness of the skeleton is desired, the method also gives the user the option of using a minimal path image to constrain the scanning order of pixels during skeletonization. The longer the path over which the minimal path image is computed, the smoother the resulting skeletons. However, the smoother skeletons will also not be as accurately positioned along the very center of the fault lines, compared to utilizing a non-smoothing computation.

Finally, the extracted skeleton image is post processed as follows:

Each skeleton is searched for any internal loops that contain an enclosed area of fewer than "skholes" number of voxels (default is 70). Skholes is a parameter set by the user. If any loops smaller than skholes are present, then the loop is broken. If the loop is filled, the resulting skeleton is reskeletonized. After any loops of the current skeleton are considered, the next skeleton is processed in the same manner, and so on until all skeletons of the current slice are processed for loops. This process enables the user to reduce the "webbed" nature that skeletons can sometimes exhibit when used on complex, fault-rich images.

The extremities used earlier as "anchor points" in the skeletonization process can themselves be thick and are thinned down to one-pixel thickness, using another constrained skeletonization process.

Finally, a "prune" number of voxels from the end of each branch of the first skeleton on the current slice in computer memory are "trimmed." "prune" is a parameter set by the user. After the current skeleton is considered, the next skeleton is processed in the same manner, and so on until all skeletons of the current slice are processed according to the "prune" parameter.

Figure 17:
FIG. 17 is an image illustrating the result of constrained skeletonization algorithm.

The result of this custom skeletonization process on the slice we have been using is shown in FIG. 17.

All remaining slices of the 3-D cube are subsequently processed as described above.

At this point, the 3-D cube consists of voxels having the value zero ("0") or one ("1"). The voxels with a value equal to one have a fault skeleton passing through the voxel.

Step 3—Flood Fill, Label, and Vectorize Fault Networks

Once the fault network has been defined, the individual fault networks are labeled, and a vector description of the fault network is obtained. This operation begins at an initial seed voxel, and a stacking process operation commences where all voxels in the primary slice which are connected (i.e., having a common edge or corner in the same slice) are sought. Each voxel is first examined to determine if the voxel has been tested for acceptance or assigned to a patch.

If the voxel has been tested and rejected, processing of that voxel is halted and processing of the next voxel begins. If the voxel has been assigned to a patch, the patch identification associated with the seed voxel and the patch identification already stored in the status field at the voxel differ. This signifies that the two patches have voxels in common and are actually parts of the same (26-way connected) patch. An estimate of the normal vectors to the surface eigenvectors is then extracted to ascertain if two patches are trending in the same direction; if so, the two patches are assumed to be part of the same fault. If the voxel belongs to a skeleton which currently unassigned, it is assigned to the parent patch. The cycle is repeated until each and every voxel has been reached. Once this has been completed, a vector description of the fault network's skeleton has been obtained.

The process of Step 3 to flood fill the individual fault networks, label them, and create a vector descriptions of the individual fault network skeletons is performed as set forth below.

In this step, the output cube from Step 2 is processed to yield a set of discrete connected patches of voxels. Each patch has the property that its voxels are 26-way connected. Two voxels on a 3-D grid are said to be 26-way connected if they share a common face, corner, or edge. Thus, by definition, starting at any voxel in the patch, it is possible to reach any other voxel by traversing a path through intermediate voxels with a common face, corner, or edge.

The patches are composed of parts of one or more candidate faults, wherein the multi-fault patch results from intersecting faults or noise in the data, and bridges the gap between faults. While efforts are made in Step 3 to minimize the creation of multi-fault patches, the emphasis in Step 3 is to produce connected patches. The emphasis later, in Step 4, is to resolve the multi-fault patch into its component fault sub-patches.

A patch is represented in computer memory as an object. The patch object is actually a data structure that contains a unique identification code, storage for the connected voxels (each voxel being an ordered triplet of 3 dimensional spatial coordinates plus an attribute such as amplitude), statistics about the voxels, and methods for performing various manipulations on patches.

The statistics include minimum and maximum range values for each variable recorded on the patch and sums of products and cross products of the variables. The statistics are sufficient to support computation of the variance-covariance of the spatial coordinates. Eigenvalues and eigenvectors derived from this matrix are also included in the object.

The patch objects include support for the merging, copying, sorting, and printing of patches, extraction of statistics, and voxel addition and deletion. In addition, these patches are expandable to hold all voxels assigned to them.

Step 3 is broken down into parts a, b, and c as follows.

Step 3a—Flood Fill

A general-purpose 3-D flood fill algorithm is used to find all discrete groupings of voxels that are mutually reachable using 26-connectedness, starting from a seed (initial) voxel, which satisfy a set of conditions and stores them as separate patch objects. In one embodiment, the voxel must have a value greater than or equal to one, which are known as the skeleton voxels. As previously described, the input skeletonized cube consists of only zeros and ones, and voxels of value one are part of a skeleton.

The flood fill algorithm finds all groups of 26-connected voxels by operating on successive pairs of adjacent slices, the first one of the pair being referred to as the primary slice and the second as the secondary slice. These slices may be taken from any face view. For purposes of discussion, the primary slice is considered to be in front of the secondary slice.

The fill strategy proceeds through the skeleton voxels in the primary slice. For each of these voxels, any voxel immediately behind, up, down, left, or right one cell (including diagonal directions) in the secondary slice is connected to it by the definition of 26-way connectedness and thus belongs to the same patch.

Two computer memory arrays are obtained and used to store the status of corresponding voxels in the primary and secondary slices.

For a given voxel in the primary slice, the primary status array indicates whether or not the voxel has already been examined for membership in a patch. If the voxel has been assigned to a patch, the primary status array entry contains the unique patch identification value of the owner patch.

Use of these status arrays results in each voxel in the cube being read, on average, only slightly more than once, and allows the processing to attain near-optimal speed. Corresponding primary and secondary stacks are used to store and retrieve the search ranges and patch assignments related to assigned voxels.

After processing of the primary slice is completed, the secondary slice becomes the new primary slice and the next slice is read from the cube, becoming the new secondary slice. By only requiring two slices in memory at one time, the method is able to process cubes that are too large to otherwise fit into computer memory.

Judicious use of the primary and secondary status arrays and stacks allow connectivity relationships to be propagated through the cube.

Step 3a is Described in Detail as Follows:

The operation begins at one corner of the primary slice and searches for the first unassigned skeletal voxel. This voxel is called the initial seed voxel.

The coordinates of the initial seed voxel, along with the row and column extents to search for 8-connected neighbors, are pushed onto the currently empty primary stack; a modified version of this information is also pushed on the secondary stack.

The stack processing operation then commences. The entry is popped from the primary stack, becoming the parent voxel. Using its associated row and column ranges, all voxels in the primary slice which are 8-connected (having a common edge or corner in the same slice) to it are sought. This search is performed in an efficient manner by proceeding on the basis of the status of each voxel being traversed. The status of a voxel under consideration is first examined to determine if that voxel has already been tested for acceptance or if it has already been assigned to a patch.

Rejected: If the voxel has already been tested and rejected (in the current implementation, it was found to fall below the threshold of one), processing of that voxel halts and processing of the next candidate voxel begins.

Already Assigned: If the voxel has already been assigned to another patch, the patch ID associated with the seed voxel and the patch ID already stored in the status field at that voxel will differ. This signifies that the two patches have voxels in common and are actually parts of the same (26-way connected) patch. In this case, estimates of the normal vectors to the surfaces eigenvectors associated with the smallest eigenvalue in each of the two patches' variance-covariance matrices are extracted.

These vectors are a good approximation to the respective normal vector to the surface formed by the voxels in each patch, a fact well known to skilled practitioners of the art. The spatial relationship of the patches may be determined from these vectors.

If the eigenvectors indicate that the patches are trending in the same direction, the two patches are assumed to be part of the same fault. This information is recorded in a temporary file so that the distinct patches can be merged in a later processing phase. If instead, the vectors indicate that the patches are trending in different directions, it is assumed that the patches come from two distinct faults and no merge instruction is generated. The patches will retain their separate identities.

By performing this test at this voxel in the processing, i.e., as soon as two patches claim the same voxel, the respective patches tend to retain a 'planar' character, minimizing the number of complex fault objects that must be segmented later.

Unassigned: If the voxel belongs to a skeleton, but is currently unassigned, it is assigned to the parent patch and its status is set appropriately. For each voxel thus found, a search range indicating adjacent row and column limits of 8-connected voxels, and the ID of the patch which that voxel is assigned to, is pushed onto the primary stack. Similar information is pushed onto the secondary stack. The next record is popped from the primary stack, becoming the new parent voxel. The secondary stack continues to accumulate information for later use.

The above sequence of operations continues until the primary stack is empty. All voxels in the primary slice which are reachable via 26-way connectedness from the initial seed voxel, and skeleton voxels in the secondary slice which are reachable from the initial seed voxel, have now been identified.

The cycle is repeated—the next unassigned skeleton voxel becomes the next initial seed voxel. Processing continues until there are no more unassigned skeleton voxels on the primary slice, or the end of the slice is reached.

Processing of the next slice begins as follows. The secondary slice becomes the primary slice, and its corresponding status and stack arrays become primary. The next slice from the Step 2 output cube is read in as the new secondary slice, with corresponding empty status and stack arrays.

The new primary stack now contains search instructions which were generated while processing the prior primary slice, and that these instructions are valid for processing the current primary slice. The processing documented above is performed to first process the "primary" stack, ensuring that voxels which are 26-way connected to patches in the previous slice are assigned correctly. Any remaining voxels on the primary slice (as determined from the primary status array) are processed into new patches.

At the completion of Step 3a, a temporary file that contains the merge instructions is established. The patches are either stored in memory, or for large datasets, stored in a temporary file on disk.

Step 3b—Merge Patches

After the entire cube has been processed as described in Step 3a, the merge phase is entered. Patches for which merge instructions were generated (because they were found to have voxels in common) are combined to form larger patches. At the completion of the merge phase, all patches will be discrete; such that a gap of at least one voxel will surround each patch.

The merge phase retrieves pairs of patch identification numbers from the file that was written in Step 3a. An arbitrary merge record may state AB, which indicates that patch A and patch B should be combined. However, complications may arise wherein, the desired result of AB followed by BC is that voxels from A, B, and C ultimately reside on the same patch. Thus, the voxels should only be copied one time to the target patch, and no copies of the original patches should remain. However, if B is first merged with A, when the attempt is made to merge C with B, B may no longer exist, or the combination may be made, but the ultimate movement of the C voxels to A may not take place because the requested B to A merge had already taken place. Thus, another complication may arise with duplicate records, which could result in voxels being copied multiple times.

The merge problem, however, may be reformulated as a graph problem. By considering each patch to be a node on a graph, a merge instruction of the form AB creates an edge (connection) between nodes A and B, since AB followed by BA is redundant, and AB followed by BC causes a path joining A, B, and C to be created.

As is well known by skilled practitioners in the field of graph theory, an adjacency matrix may be used to represent the graph. A depth-first search algorithm provides a systematic means of visiting every node and checking every edge in the graph. These can be combined to find all connected components of the graph, e.g., A, B, C.

The merge is carried out by finding all previously unvisited nodes accessible from A, successively retrieving them, and copying them to A. The graph is searched for the next 'unvisited' node, its connected nodes returned; these constitute the next merged-discrete patch, and so on, until all nodes have been visited. This completes the assembly of the discrete fault patches.

Step 3c—Sort and Write Out Patches

The final patches may optionally be sorted in ascending or descending order of number of voxels on the patch, a user-specified number of them optionally written to persistent storage, and a user-specified number of them optionally inserted into an output cube. The sort allows a specified number of the largest or smallest patches to be output.

When the patches are inserted into an output cube, the patch number, which ranges from 1 through the number of patches to be output, is mapped cyclically to the range 2–255 which is suitable for representation as an 8-bit number. All voxels of the current skeleton patch are assigned the same new value.

Step 4—Segment Fault Networks into Planar Patches

Figure 18:
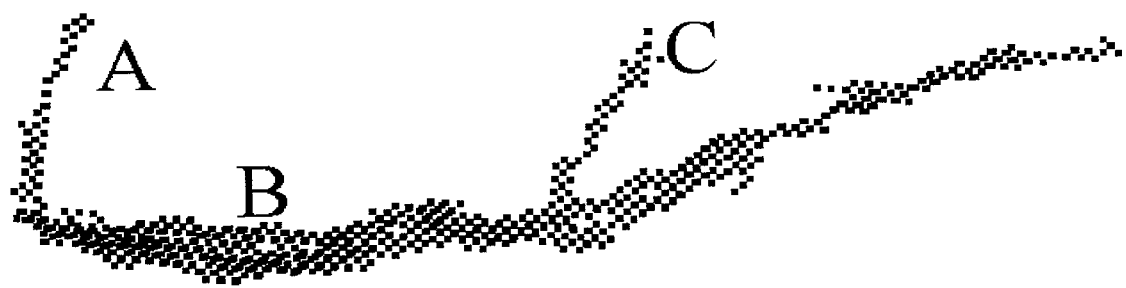
FIG. 18 is a 3-D view of an individual fault object from Step 3 which comprises parts from three different geologic faults, A, B, and C.
Figure 19:
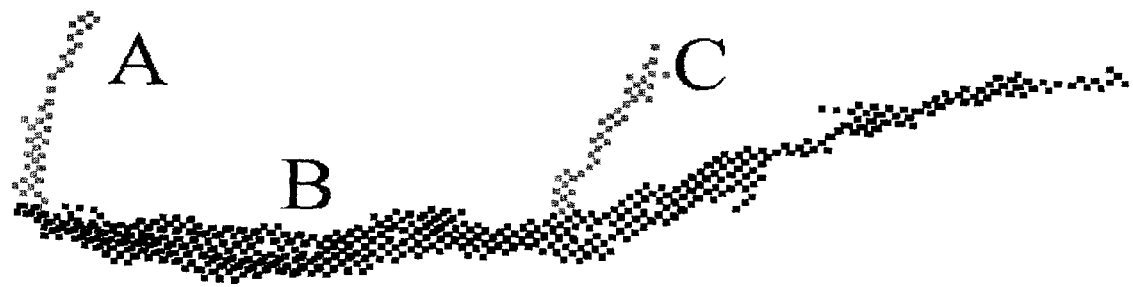
FIG. 19 is a 3-D view of the same fault object in FIG. 18, after automated separation of into three separate fault objects.

The fault network skeletons are then subdivided into the smallest, nonintersecting, non-bifurcating patches that lie on only one geologic fault. This is obtained by a vector dot product calculation. The vector dot product calculation is used to determine if the planes are parallel, perpendicular, or in a "compromise" orientation. For example, FIG. 18 shows a 3-D view of a fault object from Step 3 which is comprised of parts from three separate geologic faults. FIG. 19 shows a 3-D view of the same fault object in FIG. 18, after automated separation of into three separate fault objects, which are now colored by different shades of gray.

In Step 4, the individual fault patches are retrieved from persistent storage and processed into separate, planar, non-bifurcating fault fragments. That is, each skeleton fragment created in Step 3 is processed individually into planar fault patches and written into a separate disk file.

The fault patches are read into a 3-D lattice in a computer memory. An oriented plane is associated with each fault voxel in the lattice. This plane is the best-fit plane passing through the fault voxel, constructed using voxels within a user-specified neighborhood of the fault voxel.

In locally planar areas of the fault patch, these planes linearly approximate the fault surface and the planes calculated at adjacent voxels can be expected to be nearly parallel. In areas of high curvature, or where there is a discontinuity, such as where two or more planar components intersect, one would not expect the planes calculated at adjacent voxels to be necessarily similar. A vector dot product is used to gauge the character of the surface, in particular to measure the degree of similarity of two nearby regions.

The relevant aspects of this operation are as follows. Consider normal vectors $n_i$ and $n_j$ which are respective to planes fit at voxels $p_i$ and $p_j$. The vector dot product $n_i \cdot n_j$ returns the cosine of the angle between the vectors. In the case of two parallel planes the dot product is 1.0; if the planes are perpendicular, the dot product is zero.

To calculate $n_i$, the normal vector to the best-fit plane associated with the fault voxel $p_i$, a 3-dimensional cubic operator is centered on the voxel. This window contains an odd number of cells in each dimension, which is a user-specified value. All fault voxels contained in the operator window are considered in the calculation. In a preferred embodiment, the default window size is 3×3×3. However, it may be appreciated because the objective is to localize discontinuities with a high degree of precision, that the largest window size needed rarely exceeds 11×11×11, and 7×7×7 appears to be near optimal.

As mentioned above, the calculation of the normal vector in the cubic window considers all fault voxels in the window. However, only those fault voxels that are reachable from the center fault voxel using 26-connectedness are actually used. For example, in areas of en-echelon faulting, separate faults exist roughly parallel to each other. When voxels from multiple faults exist in the window, the separation condition prevents voxels on one fault from influencing the calculations for the best-fit plane to the other fault.

Additionally, when a group of voxels intersects another group of voxels, contributions from both groups are made only when the intersection is included in the window. This refinement locates the intersections of components with a high degree of precision.

Once a determination of which voxels to use in the calculation has been performed, their covariance matrix is formed and the normal $n_3$ is calculated as previously discussed. The normal vector is calculated in this fashion for each fault voxel in the patch.

An adjacency matrix is allocated with an entry for each fault voxel. Employing a graph theoretic approach similar to that described in Step 3, each voxel in the fault object is considered to be a node in a graph. The surface normal previously calculated at each voxel in the fault patch is compared to the surface normal of each of its immediate neighbors (those in a 26-way connected cell). The vector dot product of each pair of vectors is computed and the result compared to the cosine of a user-specified critical angle.

An edge connecting the two nodes is declared if the angle between the nodes is less than the critical angle; because the normal vectors are nearly parallel, the patches from which they emanate are nearly parallel. If the angle between the two nodes is greater than the critical angle, no edge is declared.

In a preferred embodiment, a critical angle of 5 degrees is used which passes minor local variation in the surface and accommodates gradual turning of the surface, while being suitable for detecting discontinuities. However, it may be appreciated that a critical angle of about 0 degrees to 20 degrees may be used.

A depth-first search is then conducted to find all connected components of the graph. The adjacency list is entered at the beginning and all connected nodes are visited. These comprise the first connected component and are stored as a patch object.

The adjacency list is entered at the next unvisited node past the prior initial entry and all edge-connected nodes are retrieved and, as before, stored as a patch object.

Proceeding in this fashion until there are no remaining unvisited nodes, each connected component with locally similar normal vectors are found and written to a separate patch object.

In summary, the above operation decomposes a complicated fault object into a resultant set of patch objects. In particular, the center-connected dot-product operation tends to allow the planar regions to be pushed to within 1 voxel or so of intersections. The actual intersection seam shows up as a small patch (generally on the order of 30 or so voxels) with string-like characteristics. Because the original data was skeletonized patches, omitting the small patches introduces separation between the large planar components automatically.

The resultant patches are sorted by size and output to disk files in a format suitable to viewing in commercially available 3-D data viewing software systems. An example of this is software is the Gocad product (T-Surf, Inc. and Ecole National de Geologie de France), incorporated herein in its entirety by this reference.

Step 5—Build/Correlate Faults

The individual fault patches are then correlated into realistic representations of the geologic faults for the user to visualize. The final step can be performed using either a manual or semi-manual approach, where the user views the fault patches by manually rotating the view and selecting the patches to be assigned to a fault. Alternatively, an automatic approach can be used where all associated adjacent patches that fit a geometric criterion of co-planarity based on the parameters of minimum distance between patches and the angles between the patches is set.

In Step 5, individual fault patches are joined using geometrical considerations, in order to form larger, and geologically meaningful fault objects. Typically, a "geological fault" is a gathering of a series of pseudo-coplanar and adjacent individual patches.

Two approaches are provided to achieve this goal, a semi-manual approach (Step 5a), and a guided automatic approach (Step 5b). These approaches are described as follows.

Step 5a —A Semi-Manual Approach

In Step 5a, 3-D visualization methods are used to display of all the patches in a user-controlled 3-D environment. By looking at all the input patches in a 3-D view, it is possible to visually identify geological faults.

Figure 20:
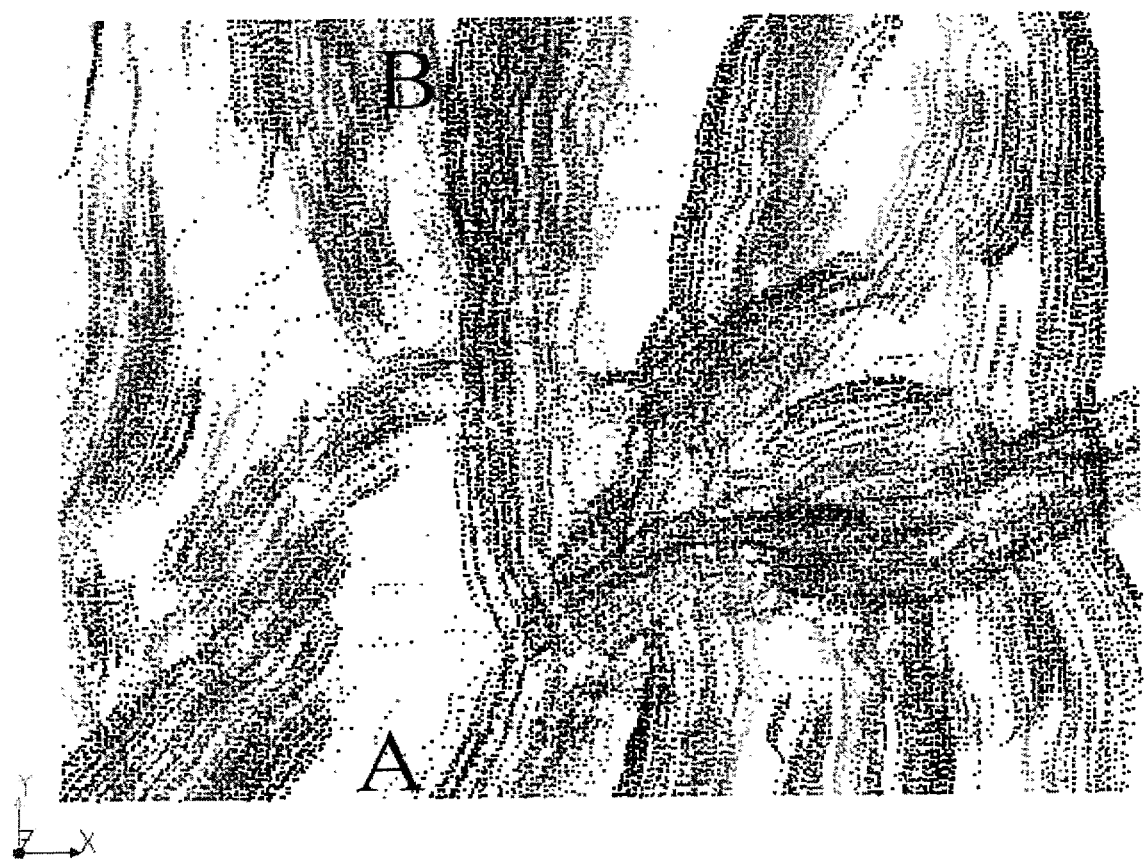
FIG. 20 is a vertical map-like view of fault pattern derived from Step 4 of the fault autopicking process.

For example, FIG. 20 shows a 3-D view of a fault pattern derived from Step 4 of the fault autopicking process. The user can reorient the view direction, rotating and change the distance to the objects to visualize the 3-D spatial relationship of the fault patches output from Step 4.

The user can orient the view so that the main plane of the fault is orthogonal to the plane of view. In such a view (FIG. 21), all the separate patches that belong to a single geological fault (and the member voxels of these patches) are approximately lined-up behind the ones that are closest to the user view reference point.

Figure 21:
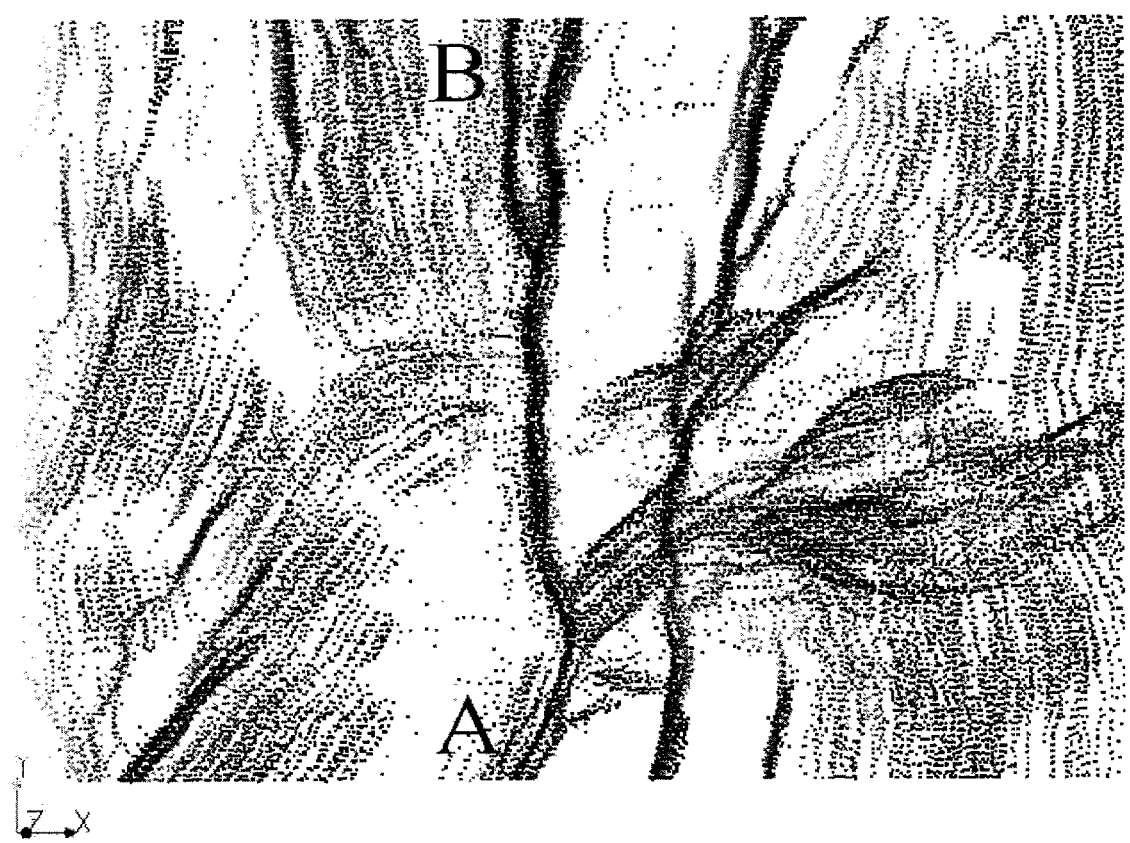
FIG. 21 is an image illustrating a fault pattern oriented in 3-D.

By digitizing a curve on the view along the patches described above, for example along geologic fault "AB" in FIG. 21, the user will define the lateral extension of the geological fault to be correlated. Such a curve will not need to be a straight line, but will allow the user to follow lateral curvature of a fault plane.

Figure 22:
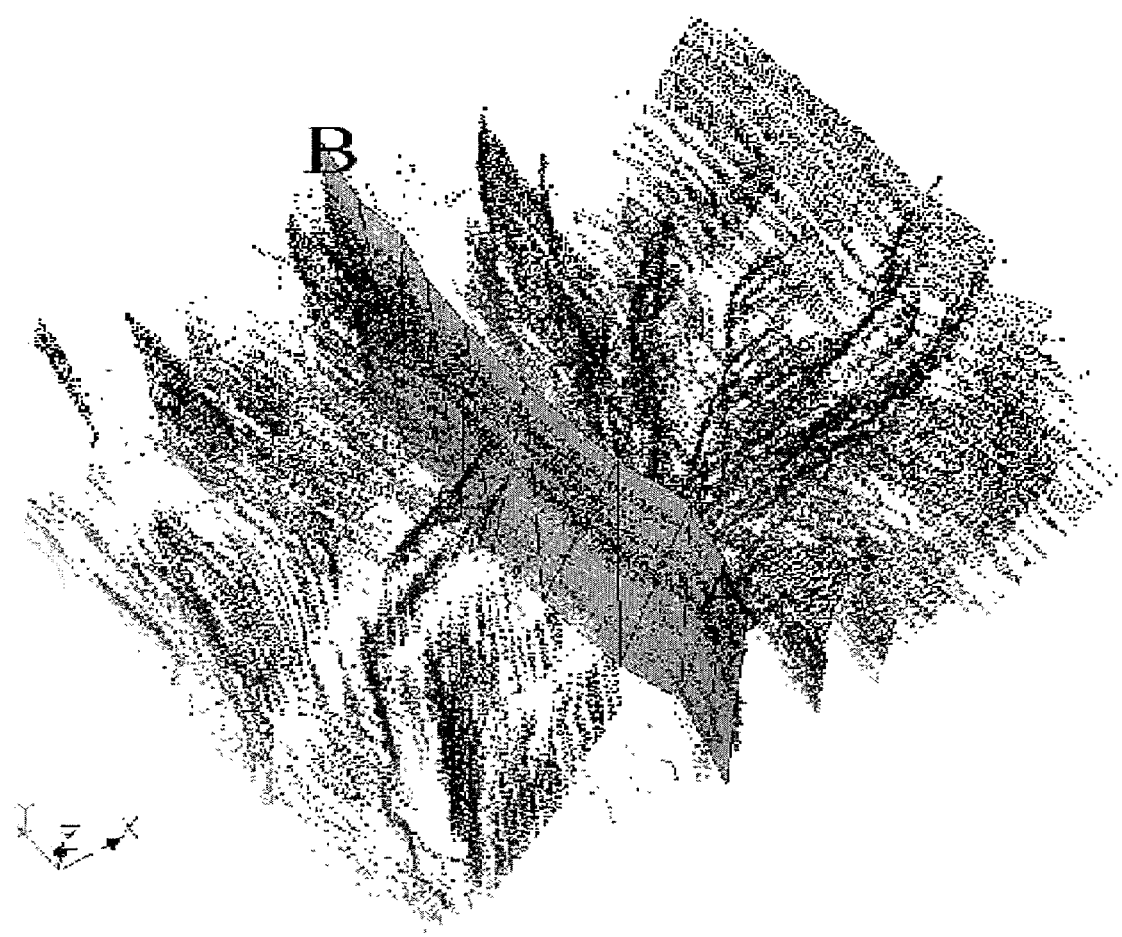
FIG. 22 is a 3-D view showing a curtain dropped along fault "AB"

From this digitized line, a "curtain surface" is built (FIG. 22). The curtain is a surface that is generated from the digitized line, by extending the line to depth, along the direction orthogonal to the view. The curtain is represented by a triangulated surface, and is a rough representation of the final geological fault surface.

From this initial curtain, an iterative routine is used to obtain a better representation of the fault surface:

A. On either side of the curtain, the algorithm looks for points of all the input patches that are within a user-specified distance on both sides of the curtain. The distance is computed, for each point, by looking at the "best projection" of the voxel onto the curtain. The best projection will be a combination of minimum distance to any triangle of the surface and direction of the normal to these triangles. Such a direction is called the "optimized direction."

Figure 23:
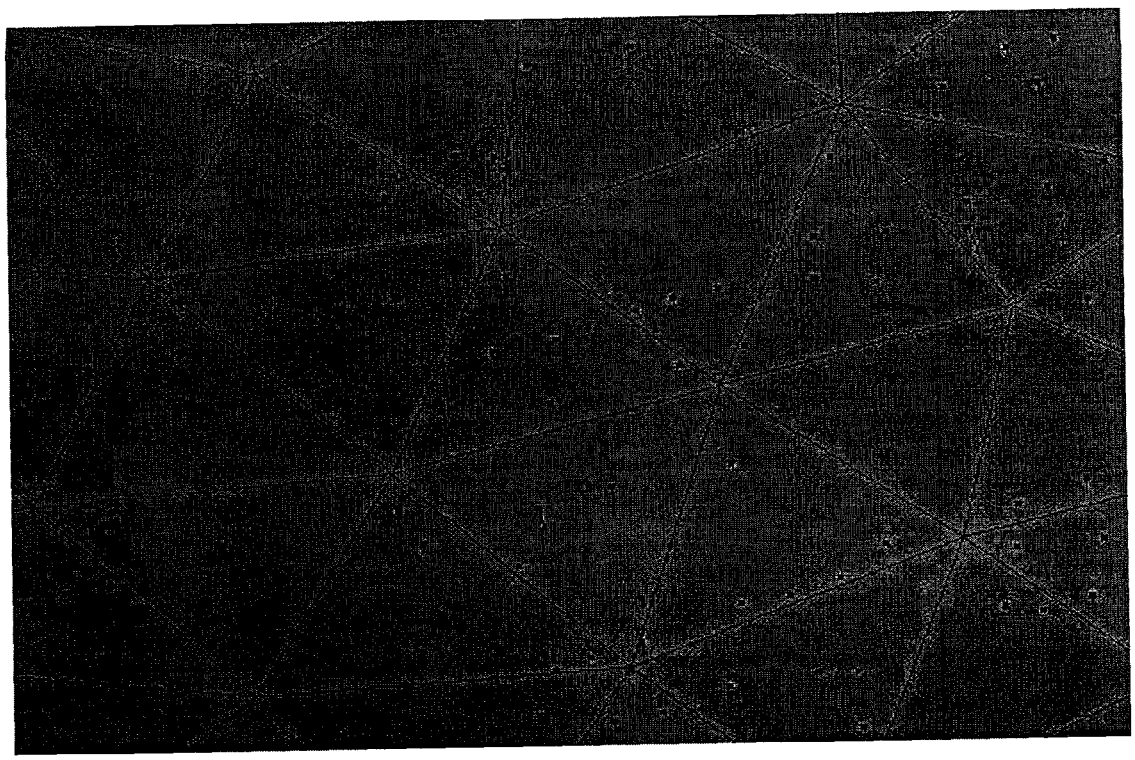
FIG. 23 is an image illustrating a triangulated surface shown as black triangles, along with input control points shown as dots with tails, and wherein the length of the tail corresponds to the deviation of the triangulated surface at that point from the position of the control point.

B. After all of the points within the specified distance are detected, they become "fuzzy control points" and are used to obtain a smooth interpolation of the fault curtain. A fuzzy control point is a constraint placed on the surface that should be honored if possible, but can be ignored under user specified conditions. Each of these points will set a constraint to its paired triangle (using the optimized direction), and the surface geometry will be interpolated in order to minimize its roughness as well as honoring the fuzzy control points (FIG. 23).

From this new version of the fault curtain, we will loop through steps A and B until convergence is reached.

Step 5b—A Guided, Automatic Approach

Figure 24:
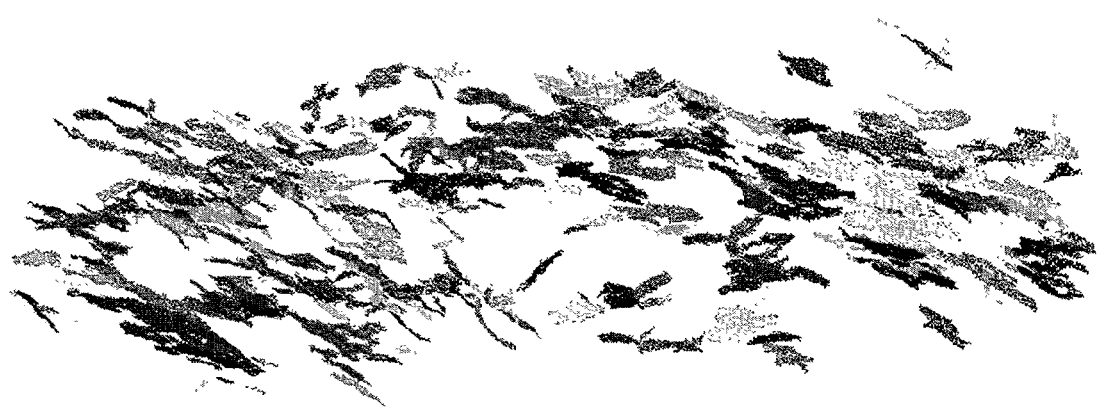
FIG. 24 is an image illustrating a collection of fault patches obtained from Step 4 of the fault autopicking process.
Figure 25:
FIG. 25 is an image illustrating the larger groups of patches from FIG. 24 after correlation by Step 5b.

In Step 5b, a more automated approach is implemented to correlate patches that belong to similar geological fault surfaces. FIG. 24 shows a 3-D perspective view of a large collection of fault patches from Step 4. The goal is to automatically associate adjacent patches that fit geometric criteria of co-planarity and proximity, thereby reducing the number of patches and deriving geologic faults as shown in FIG. 25.

Starting from the largest patch (P1—the one with the greatest number of points), all other patches (P1a, P1b . . . ) that should be correlated to it are found, as determined by a series of user-defined parameters. These parameters are the minimum distance between patches, and the angle between patches.

A pre-processing step involves using a fast scan of all patches to determine whether or not two patches are even close to each other for further consideration. For each patch, a hypothetical bounding box is imagined, which extends as far in the orthogonal X, Y and Z planes (where X is parallel to the earth's lines of longitude, Y is parallel to lines of latitude, and Z is depth as measured in the fault-enhanced seismic attribute volume) as the data range.

The box is then extended in the x and y directions equal to twice the minimum distance that the user provided as described above. These bounding boxes are analyzed and basic statistics are stored (bounding box: minimum and maximum X, Y and Z values) for all patches/boxes, so that they do not have to be computed at every step. If the bounding box for Patch P1 and P1a overlap in space these patches are considered to be close enough for more detailed evaluation.

Once a patch has been identified as being near the largest patch, it is more rigorously compared to patch P1. The first check is to compare the orientation of the two patches. A best-fit plane is computed by using a 3-D principal component algorithm. The third of the three principal components will provide the normal to the best-fit plane. Two patches that are parallel will have normals oriented in the same direction. By comparing the angular difference between the orientation of the normals the user can determine if the patches are similarly oriented.

If P1 and P1a have been found to match the angle criteria, the patches are checked for distance criteria. Only patches that are co-planar will be merged. We do not want to correlate or merge two patches that are parallel to each other, but not aligned with each other, which would be indicative of two separate parallel faults. Instead of computing the distance between each pair of points of P1 and P1a, the distance between the two patches is computed using a simplified representation of both patches by calculating their convex hull.

In another embodiment, a method of subdividing a fault segment includes the steps of flood filling a fault network to identify a plurality of fault segments, labeling the fault segments, and creating a vector description of the fault segments; and subdividing the fault segments to create the smallest, non-intersecting, non-bifurcating patches that lie on only one geologic fault.

In a further embodiment, a method of correlating individual fault patches into realistic representations of geologic faults includes the steps of scanning individual fault patches to determine whether two individual fault patches are close to each other for further evaluation; and if the individual fault patches are determined to be close, then automatically correlating associated adjacent individual fault patches that fit a geometric criteria of co-planarity based on pre-determined parameters of minimum distance and angles between the patches. The pre-determined parameters are selected by visually evaluating the individual fault patches. The patches are then visually displayed and are iteratively correlated to provide an improved geologic fault representation.

Figure 26:
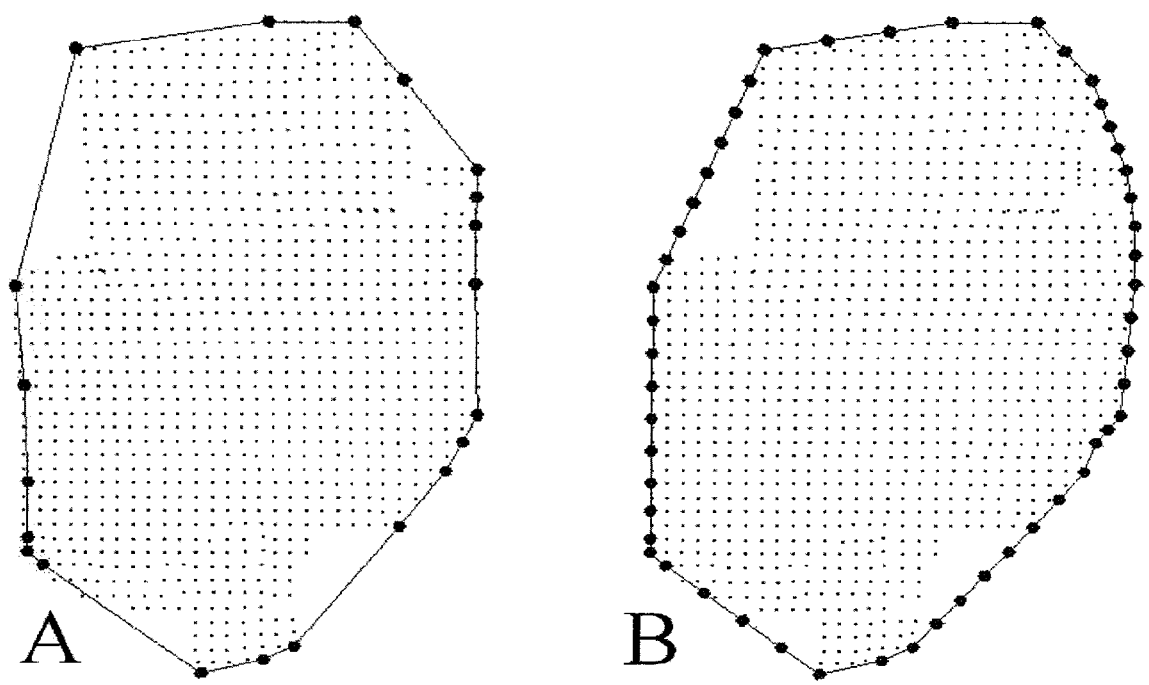
FIG. 26A is an image illustrating the data points of a fault patch and the initial convex hull points as dots around the perimeter of the patch.
FIG. 26B is an image illustrating the fault patch of FIG. 26A after regularization of the convex hull segments to a more consistent length.

A convex hull is the line which can be drawn around the data limit of the patch (FIG. 26A). The convex hull of each patch is computed and stored so that it will not need to be computed again next time a given patch is being considered for correlation. The convex hull is then regularized so that the segments of the boundary all have an average length (FIG. 26B).

The distance between each pair of points along the convex hull is computed. This is used as an approximation for calculating the distance between patches, and is a computationally efficient way of measuring the distances between each patch. If the minimum distance found is less than user-specified distance parameter, P1a is merged or correlated (in interpretation parlance) to P1, and statistics are updated for this new version of P1 (bounding box, principal components).

P1a is then removed from the list of input patches, and the next patch, P1b is considered, and processed through all parts of Step 5b.

When no more patches can be correlated with P1, the next largest patch (P2) is located and processed through all the parts of Step 5b.

From each geologically correlated fault point set, a corresponding triangulated surface is built using a method similar to the one described in Step 5a (FIG. 23) that is, all points of the patch are used as fuzzy control points for interpolation of triangulated mesh to data points.

While the invention has been described in detail with reference to the preferred embodiments thereof, it will be apparent to one skilled in the art that various changes and modifications can be made and equivalents employed without departing from the present invention.

PATENT
Attorney Docket No. 005950-664

Appendix A

Extraction of fault lines from seismic cube slices. Input data should be provided as an ordered list of tiff files, or a single VoxelGeo volume.

Usage:
faults [-tiff] [-xscale <float>] [-yscale <float>]
       [-invert] [-gray] [-prepdir <directory>]
       [-iscale] [-iprep] [-iaz]
       [-iproc1] [-iresid] [-ithresh]
       [-iskel] [-iall] [-iter <number>]
       [-ndir <number>] [-proc1 <size>] [-resid <size>]
       [-thresh <threshold>] [-area <size>] [-proc2 <size>]
       [-branch <value>] [-smoothiter <value>] [-skholes <size>]
       [-prune <size>] [-defaults] [-help] [voxelgeo_volume |     [[tiff-1] tiff-2] ... tiff-n]

| | |
|---|---|
| -tiff: | Output result images as TIFF even if input data was supplied as a VoxelGeo cube |
| -xscale: | Scaling to be applied in X direction before processing. Note that processing time is a linear function of this scaling. |
| -yscale: | Scaling to be applied in Y direction before processing. Same comments apply. |
| -invert: | Invert original image before processing |
| -gray: | Output binary images as LZW compressed gray TIFF files instead of CCITT G4 compressed binary TIFF files |
| -prepdir: | Directory of precomputed 'prep' and 'az' images or volumes (if any). The images/volumes in this directory must have been computed using same X- and Y-scaling as specified above. It is assumed that if input to this program is a list of TIFF files, or if -tiff flag is used, then the directory of precomputed images contains TIFF images. Otherwise, this directory must contain VoxelGeo volumes. |
| -iscale: | Output scaled original image (if scaling was applied) |
| -iprep: | Output prep image |
| -iaz: | Output azimuth image |

-47-

| | | |
|---|---|---|
| | -iproc1: | Output processing step 1 of prep image |
| | -iresid: | Output residual of prep image |
| | -ithresh: | Output image of thresholded residual |
| | -iskel: | Output image of skeleton before final |
| 5 | | postprocessing |
| | -iall: | Enable all the above flags |
| | -iter: | Specify number of iterations in fault search algorithm(overrides default). Each iteration corresponds to a length of 4 pixels. |
| | -ndir: | Specify number of neighboring cone directions (overrides default). Larger |
| 10 | | values increase processing time, but make the algorithm better able to detect short curved fault lines. |
| | -proc1: | Specify ability to connect broken fault lines (overrides default) |
| | -resid: | Specify size of filter to obtain residual image (overrides default) |
| | -thresh: | Specify level of threshold of residual (overrides default) |
| 15 | -area: | Specify minimal number of pixels for structures considered in thresholded residual image (overrides default) |
| | -proc2: | Specify size of filter used for clean-up of previous binary image (overrides default) |
| | -branch: | Specify length of branches required for survival (overrides default). Basically, |
| 20 | | this controls the minimal length of a structure in order for it to be considered relevant. |
| | -smoothiter | Specify number of smoothing iterations before skeletonization (overrides default). Careful: this operation is expensive, unless 'smoothiter' is set to 0 or to the same value as 'iter.' |
| 25 | -skholes: | Specify minimal acceptable size for skeleton holes (overrides default) |
| | -prune: | Specify size of skeletal pruning done at the end (overrides default) |
| | -defaults: | Print value of default parameters |
| | -help: | Print this message and exit |

30

What is claimed is:

1. A method for extracting geologic faults from a 3-D seismic attribute cube, the method comprising:
    calculating a minimum path value for each voxel of the 3-D seismic attribute cube;
    extracting a fault network skeleton from the 3-D seismic attribute cube by utilizing the minimum path values which correspond to voxels within the 3-D seismic attribute cube;
    flood filling the fault network to identify a plurality of fault segments, labeling the fault segments, and creating a vector description of the fault network skeleton;
    subdividing the fault segments into individual fault patches wherein the individual fault patches are the smallest, non-intersecting, non-bifurcating patches that lie on only one geologic fault; and
    correlating the individual fault patches into a representation of geologic faults.

2. The method according to claim 1, wherein the step of calculating a minimum path value includes calculating a 3-D minimum path value.

3. The method according to claim 1, wherein the step of calculating a minimum path further includes calculating the minimum path value of each voxel considering all routes from a pixel "P" to one of a plurality of termination pixels "T" which is equal to or greater than 4, and summing the values of all voxels along this route.

4. The method according to claim 1, wherein the step of calculating a minimum path further includes calculating the minimum path value using a raster order for each of 16 predefined orientations.

5. The method according to claim 1, wherein the step of calculating a minimum path further includes calculating the minimum path value using a reverse-raster order for each of 16 predefined orientations.

6. The method according to claim 1, further comprising applying a directional filter to the minimum path values to improve the connections between adjacent minimum path values.

7. The method according to claim 1, further comprising performing a morphological top hat operation to create a top hat image.

8. The method according to claim 7, further comprising a binarization of the top hat image utilizing a simple threshold.

9. The method according to claim 8, further comprising extracting a plurality of extremities from the binarization of the top hat image.

10. The method according to claim 9, further comprising skeletonizing the binarization of the top hat image, such that the skeleton passes through the extremities and through a highest values of the top hat image.

11. The method according to claim 1, further comprising cleaning up the fault network skeleton using a pruning algorithm.

12. The method according to claim 1, wherein the voxels which are on the fault skeleton are assigned a finding of "fault."

13. The method according to claim 12, further comprising finding discrete grouping of voxels which were assigned a finding of "fault", that are mutually connected into fault segments.

14. The method according to claim 1, further comprising determining an angle of an eigenvector of a variance-covariance matrix associated with a segment, and if the angle is within a pre-determined range, then maintaining the segment as a single patch, and if the angle outside the pre-determined range then subdividing the segment into at least two fault patches.

15. The method according to claim 1, wherein the step of subdividing further comprises utilizing an adjacency list to merge a plurality of fault patches which have voxels in common.

16. The method according to claim 1, further comprising determining a vector description of the fault network by determining an angle of an eigenvector of a variance-covariance matrix associated with connected segments, and if an angular difference is within a pre-determined range, then maintaining the segments as a single patch, and if the angular difference is outside the pre-determined range then subdividing the segment into at least two fault patches with their associated eigenvectors.

17. The method according to claim 1, wherein the step of labeling further comprises constructing a best-fit plane from adjacent connected points within a 3-D lattice.

18. The method according to claim 1, wherein the step of subdividing further comprises calculating a normal to a best-fit plane for each voxel on a fault patch fragment in a 3-D lattice.

19. The method according to claim 1, wherein the step of subdividing further comprises constructing a best-fit plane from adjacent connected points within a 3-D lattice, and calculating a normal to a best-fit plane for each voxel on a fault patch fragment in a 3-D lattice.

20. The method according to claim 18, wherein the step of calculating includes comparing the normal best-fit plane between each adjacent voxel that lies on a fault patch fragment, and identifying the normal best-fit planes which are within the user-supplied limit, and merging similarly oriented fault fragments into a fault patch.

21. The method according to claim 19, wherein the step of constructing includes comparing the normal best-fit plane between each adjacent voxel that lies on a fault patch fragment, and identifying the normal best-fit planes which are within the user-supplied limit, and merging similarly oriented fault fragments into a fault patch.

22. The method according to claim 1, further comprising correlating the individual fault patches into realistic representations of geologic faults in a manual or semi-manual approach.

23. The method according to claim 22, wherein the step of correlating further includes manually rotating a view and selecting the individual fault patches to be assigned to a fault.

24. The method according to claim 22, wherein a user views the individual fault patches by manually rotating and interactively selecting correlated patches while iterating on an acceptable distance to an object.

25. The method according to claim 22, further comprising reorienting a view direction directly down the dip direction of the individual fault patches, digitizing a trace of the fault along a time slice, and dropping a fault surface in the direction of the view.

26. The method according to claim 1, further comprising correlating the individual fault patches into realistic representations of geologic faults in an automatic approach.

27. The method according to claim 26, further comprising automatically correlating associated adjacent individual fault patches that fit a geometric criteria of co-planarity based on the selected parameters of minimum distance and angles between the patches.

28. The method according to claim 26, further comprising a pre-processing step using a fast scan of all individual fault patches to determine whether or not two individual fault patches are close to each other for further consideration.

29. A method for extracting geologic faults from a 3-D seismic attribute cube, the method comprising:
calculating a minimum path value for each voxel of the 3-D seismic attribute cube;
extracting a fault network skeleton from the 3-D seismic attribute cube by utilizing the minimum path values which correspond to voxels within the 3-D seismic attribute cube;
flood filling the fault network to identify a plurality of fault segments, labeling the fault segments, and creating a vector description of the fault network skeleton;
subdividing the fault network skeleton into individual fault patches; and
correlating the individual fault patches into a representation of geologic faults.

30. A method for extracting faults from a 3-D seismic attribute cube, the method comprising:
reading a composite fault fragment into a 3-D lattice of finite size into a computer memory; and
constructing a best-fit plane from adjacent connected points within the 3-D lattice.

31. A method of correlating individual fault patches into realistic representations of geologic faults comprising:
scanning individual fault patches to determine whether two individual fault patches are close to each other for further evaluation; and
if the individual fault patches are determined to be close, then automatically correlating associated adjacent individual fault patches that fit a geometric criteria of co-planarity based on pre-determined parameters of minimum distance and angles between the patches.

32. The method according to claim 31, wherein the predetermined parameters are selected by visually evaluating the individual fault patches.

33. The method according to claim 31, wherein patches are visually displayed and are iteratively correlated to provide an improved geologic fault representation.

34. A method for extracting faults from a 3-D seismic attribute cube, the method comprising:
calculating a 3-D minimum path value for each voxel of the 3-D seismic attribute cube; and
combining the 3-D minimum path value at each voxel with the 3-D seismic attribute cube to extract a fault network skeleton.

35. A method of subdividing a fault segment comprising flood filling a fault network to identify a plurality of fault segments, labeling the fault segments, and creating a vector description of the fault segments; and
subdividing the fault segments to create the smallest, non-intersecting, non-bifurcating patches that lie on only one geologic fault.

36. The method according to claim 35, wherein the step of labeling further comprises constructing a best-fit plane from adjacent connected points within a 3-D lattice.

37. The method according to claim 35, wherein the step of subdividing further comprises calculating a normal to a best-fit plane for each voxel on a fault patch fragment in a 3-D lattice.

38. The method according to claim 35, wherein the step of subdividing further comprises constructing a best-fit plane from adjacent connected points within a 3-D lattice, and calculating a normal to a best-fit plane for each voxel on a fault patch fragment in a 3-D lattice.

39. The method according to claim 37, wherein the step of calculating includes comparing the normal best-fit plane between each adjacent voxel that lies on a fault patch, and identifying the normal best-fit planes which are within the user-supplied limit, and merging similarly oriented fault patches.

40. The method according to claim 38, wherein the step of constructing includes comparing the normal best-fit plane between each adjacent voxel that lies on a fault patch fragment, and identifying the normal best-fit planes which are within the user-supplied limit, and merging similarly oriented fault fragments into a fault patch.

41. A method of identifying fault segments from a fault network comprising:
providing a fault network having a plurality of fault segments;
using an adjacency list to merging fault patch fragments which contain voxels in common;
labeling the fault segments; and
creating a vector description of the fault segments.

42. The method according to claim 41, further comprises finding discrete grouping of voxels which were assigned a finding of "fault", that are mutually connected into fault segments.

43. The method according to claim 41, wherein the step of creating further includes determining an angle of an eigenvector of a variance-covariance matrix associated with a segment, and if the angle is within a pre-determined range, then maintaining the segment as a single patch, and if the angle outside the pre-determined range then subdividing the segment into at least two fault patches.

44. The method according to claim 41, wherein the step of labeling further comprises constructing a best-fit plane from adjacent connected points within a 3-D lattice.

45. A computer-readable medium containing executable code for extracting geologic faults from a 3-D seismic attribute cube, which when executed performs procedures of:
calculating a minimum path value for each voxel of the 3-D seismic attribute cube;
extracting a fault network skeleton from the 3-D seismic attribute cube by utilizing the minimum path values which correspond to voxels within the 3-D seismic attribute cube;
flood filling the fault network to identify a plurality of fault segments, labeling the fault segments, and creating a vector description of the fault network skeleton;
subdividing the fault segments into individual fault patches wherein the individual fault patches are the smallest, non-intersecting, non-bifurcating patches that lie on only one geologic fault; and
correlating the individual fault patches into a representation of geologic faults.

46. The computer-readable medium containing executable code according to claim 45, wherein the step of calculating a minimum path value includes calculating a 3-D minimum path value.

47. The computer-readable medium containing executable code according to claim 45, wherein the step of calculating a minimum path further includes calculating the minimum path value of each voxel considering all routes from a pixel "P" to one of a plurality of termination pixels "T" which is equal to or greater than 4, and summing the values of all voxels along this route.

48. The computer-readable medium containing executable code according to claim 45, wherein the step of calculating a minimum path further includes calculating the minimum path value using a raster order for each of 16 predefined orientations.

49. The computer-readable medium containing executable code according to claim 45, wherein the step of calculating a minimum path further includes calculating the minimum path value using a reverse-raster order for each of 16 predefined orientations.

50. The computer-readable medium containing executable code according to claim 45, further comprising applying a directional filter to the minimum path values to improve the connections between adjacent minimum path values.

51. The computer-readable medium containing executable code according to claim 45, further comprising performing a morphological top hat operation to create a top hat image.

52. The computer-readable medium containing executable code according to claim 51, further comprising a binarization of the top hat image utilizing a simple threshold.

53. The computer-readable medium containing executable code according to claim 52, further comprising extracting a plurality of extremities from the binarization of the top hat image.

54. The computer-readable medium containing executable code according to claim 53, further comprising skeletonizing the binarization of the top hat image, such that the skeleton passes through the extremities and through a highest values of the top hat image.

55. The computer-readable medium containing executable code according to claim 45, further comprising cleaning up the fault network skeleton using a pruning algorithm.

56. The computer-readable medium containing executable code according to claim 45, wherein the voxels which are on the fault skeleton are assigned a finding of "fault."

57. The computer-readable medium containing executable code according to claim 56, further comprising finding discrete grouping of voxels which were assigned a finding of "fault", that are mutually connected into fault segments.

58. The computer-readable medium containing executable code according to claim 45, further comprising determining an angle of an eigenvector of a variance-covariance matrix associated with a segment, and if the angle is within a pre-determined range, then maintaining the segment as a single patch, and if the angle outside the pre-determined range then subdividing the segment into at least two fault patches.

59. The computer-readable medium containing executable code according to claim 45, wherein the step of subdividing further comprises utilizing an adjacency list to merge a plurality of fault patches which have voxels in common.

60. The computer-readable medium containing executable code according to claim 45, further comprising determining a vector description of the fault network by determining an angle of an eigenvector of a variance-covariance matrix associated with connected segments, and if an angular difference is within a pre-determined range, then maintaining the segments as a single patch, and if the angular difference is outside the pre-determined range then subdividing the segment into at least two fault patches with their associated eigenvectors.

61. The computer-readable medium containing executable code according to claim 45, further comprising determining a vector description of the fault network by determining an angle of an eigenvector of a variance-covariance matrix associated with connected segments, and if the angular difference is within a pre-determined range, then maintaining the segments as a single patch, and if the angular difference is outside the pre-determined range then labeling the segment into at least two fault patches with their associated eigenvectors.

62. The computer-readable medium containing executable code according to claim 45, wherein the step of subdividing further comprises calculating a normal to a best-fit plane for each voxel on a fault patch fragment in a 3-D lattice.

63. The computer-readable medium containing executable code according to claim 45, wherein the step of subdividing further comprises constructing a best-fit plane from adjacent connected points within a 3-D lattice, and calculating a normal to a best-fit plane for each voxel on a fault patch fragment in a 3-D lattice.

64. The computer-readable medium containing executable code according to claim 62, wherein the step of calculating includes comparing the normal best-fit plane between each adjacent voxel that lies on a fault patch fragment, and identifying the normal best-fit planes which are within the user-supplied limit, and merging similarly oriented fault fragments into a fault patch.

65. The computer-readable medium containing executable code according to claim 63, wherein the step of constructing includes comparing the normal best-fit plane between each adjacent voxel that lies on a fault patch fragment, and identifying the normal best-fit planes which are within the user-supplied limit, and merging similarly oriented fault fragments into a fault patch.

66. The computer-readable medium containing executable code according to claim 45, further comprising correlating the individual fault patches into realistic representations of geologic faults in a manual or semi-manual approach.

67. The computer-readable medium containing executable code according to claim 66, wherein the step of correlating further includes manually rotating a view and selecting the individual fault patches to be assigned to a fault.

68. The computer-readable medium containing executable code according to claim 66, wherein a user views the individual fault patches by manually rotating and interactively selecting correlated patches while iterating on an acceptable distance to an object.

69. The computer-readable medium containing executable code according to claim 66, further comprising reorienting a view direction directly down the dip direction of the individual fault patches, digitizing a trace of the fault along a time slice, and dropping a fault surface in the direction of the view.

70. The computer-readable medium containing executable code according to claim 45, further comprising correlating the individual fault patches into realistic representations of geologic faults in an automatic approach.

71. The computer-readable medium containing executable code according to claim 70, further comprising automatically correlating associated adjacent individual fault patches that fit a geometric criteria of co-planarity based on the selected parameters of minimum distance and angles between the patches.

72. The computer-readable medium containing executable code according to claim 70, further comprising a pre-processing step using a fast scan of all individual fault patches to determine whether or not two individual fault patches are close to each other for further consideration.

73. A computer-readable medium containing executable code for extracting geologic faults from a 3-D seismic attribute cube, which when executed performs procedures of:
- calculating a minimum path value for each voxel of the 3-D seismic attribute cube;
- extracting a fault network skeleton from the 3-D seismic attribute cube by utilizing the minimum path values which correspond to voxels within the 3-D seismic attribute cube;
- flood filling the fault network to identify a plurality of fault segments, labeling the fault segments, and creating a vector description of the fault network skeleton;
- subdividing the fault network skeleton into individual fault patches; and
- correlating the individual fault patches into a representation of geologic faults.

74. A computer-readable medium containing executable code for extracting faults from a 3-D seismic attribute cube, which when executed performs procedures of:
- reading a composite fault fragment into a 3-D lattice of finite size into a computer memory; and
- constructing a best-fit plane from adjacent connected points within the 3-D lattice.

75. A computer-readable medium containing executable code of correlating individual fault patches into realistic representations of geologic faults which when executed performs procedures of:
- scanning individual fault patches to determine whether two individual fault patches are close to each other for further evaluation; and
- if the individual fault patches are determined to be close, then automatically correlating associated adjacent individual fault patches that fit a geometric criteria of co-planarity based on pre-determined parameters of minimum distance and angles between the patches.

76. The computer-readable medium containing executable code according to claim 75, wherein the pre-determined parameters are selected by visually evaluating the individual fault patches.

77. The computer-readable medium containing executable code according to claim 75, wherein patches are visually displayed and are iteratively correlated to provide an improved geologic fault representation.

78. A computer-readable medium containing executable code for extracting faults from a 3-D seismic attribute cube, which when executed performs procedures of:
- calculating a 3-D minimum path value for each voxel of the 3-D seismic attribute cube; and
- combining the 3-D minimum path value at each voxel with the 3-D seismic attribute cube to extract a fault network skeleton.

79. A computer-readable medium containing executable code of subdividing a fault segment which when executed performs procedures of:
- flood filling a fault network to identify a plurality of fault segments, labeling the fault segments, and creating a vector description of the fault segments; and
- subdividing the fault segments to create the smallest, non-intersecting, non-bifurcating patches that lie on only one geologic fault.

80. The computer-readable medium containing executable code according to claim 79, wherein the step of labeling further comprises constructing a best-fit plane from adjacent connected points within a 3-D lattice.

81. The computer-readable medium containing executable code according to claim 79, wherein the step of subdividing further comprises calculating a normal to a best-fit plane for each voxel on a fault patch fragment in a 3-D lattice.

82. The computer-readable medium containing executable code according to claim 79, wherein the step of subdividing further comprises constructing a best-fit plane from adjacent connected points within a 3-D lattice, and calculating a normal to a best-fit plane for each voxel on a fault patch fragment in a 3-D lattice.

83. The computer-readable medium containing executable code according to claim 81, wherein the step of calculating includes comparing the normal best-fit plane between each adjacent voxel that lies on a fault patch, and identifying the normal best-fit planes which are within the user-supplied limit, and merging similarly oriented fault patches.

84. The computer-readable medium containing executable code according to claim 82, wherein the step of constructing includes comparing the normal best-fit plane between each adjacent voxel that lies on a fault patch fragment, and identifying the normal best-fit planes which are within the user-supplied limit, and merging similarly oriented fault fragments into a fault patch.

85. A computer-readable medium containing executable code of identifying fault segments from a fault network which when executed performs procedures of:
- providing a fault network having a plurality of fault segments;
- using an adjacency list to merging fault patch fragments which contain voxels in common;
- labeling the fault segments; and
- creating a vector description of the fault segments.

86. The computer-readable medium containing executable code according to claim 85, further comprises finding discrete grouping of voxels which were assigned a finding of "fault", that are mutually connected into fault segments.

87. The computer-readable medium containing executable code according to claim 85, wherein the step of creating further includes determining an angle of an eigenvector of a variance-covariance matrix associated with a segment, and if the angle is within a pre-determined range, then maintaining the segment as a single patch, and if the angle outside the pre-determined range then subdividing the segment into at least two fault patches.

88. The computer-readable medium containing executable code according to claim 85, wherein the step of labeling further comprises constructing a best-fit plane from adjacent connected points within a 3-D lattice.

* * * * *